(12) United States Patent
Maruyama et al.

(10) Patent No.: US 6,544,459 B2
(45) Date of Patent: Apr. 8, 2003

(54) METHOD OF INJECTION MOLDING MULTI-LAYERED ARTICLES

(75) Inventors: Katsuya Maruyama, Hiratsuka (JP); Takeshi Hara, Hiratsuka (JP); Yoshihiro Terada, Tokyo (JP); Takao Ota, Tokyo (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 18 days.

(21) Appl. No.: 09/964,726

(22) Filed: Sep. 28, 2001

(65) Prior Publication Data

US 2002/0036366 A1 Mar. 28, 2002

Related U.S. Application Data

(62) Division of application No. 09/158,537, filed on Sep. 22, 1998, now Pat. No. 6,322,344.

(30) Foreign Application Priority Data

Sep. 25, 1997 (JP) .............................................. 9-259903
Sep. 29, 1997 (JP) .............................................. 9-263862

(51) Int. Cl.⁷ ........................... B29C 45/16; B29C 45/20
(52) U.S. Cl. ...................... 264/255; 264/328.8; 425/130
(58) Field of Search ................................. 264/255, 510, 264/328.1, 328.8, 328.12, DIG. 57; 425/129.1, 130, 564, 573

(56) References Cited

U.S. PATENT DOCUMENTS

| 4,535,901 A | 8/1985 | Okudaira et al. | |
| 4,657,496 A | 4/1987 | Ozeki et al. | 264/328.8 |
| 4,840,553 A * | 6/1989 | Arai | 425/129.1 |
| 5,645,786 A | 7/1997 | Okada et al. | 264/255 |
| 6,074,190 A * | 6/2000 | Nagaoka et al. | 425/130 |
| 6,440,350 B1 * | 8/2002 | Gellert et al. | 264/328.1 |

FOREIGN PATENT DOCUMENTS

| DE | 35 19 921 | 12/1985 |
| EP | 0 161 625 | 11/1985 |
| JP | 57-128520 | 8/1982 |
| JP | 60-240409 | 11/1985 |
| JP | 61-206612 | 9/1986 |
| JP | 61-206612 | 2/1987 |
| WO | 88/00117 | 1/1988 |

* cited by examiner

Primary Examiner—Angela Ortiz
(74) Attorney, Agent, or Firm—Wenderoth, Lind & Ponack, L.L.P.

(57) ABSTRACT

An injection molding apparatus for injection molding a multi-layered article, which comprises; (a) a mold having a cavity block provided with a cavity and a hot runner block, (b) at least a first injection cylinder and a second injection cylinder, (c) a first resin-flow-passage for connecting an inside of the first injection cylinder and the cavity, and (d) a second resin-flow-passage for connecting an inside of the second injection cylinder and the cavity, the injection molding apparatus having a structure in which those portions of the first and second resin-flow-passages which are located within the mold are provided in the hot runner block, and the first resin-flow-passage and the second resin-flow-passage meet with each other in a junction portion upstream to a gate portion opened to the cavity, the injection molding apparatus being provided with back flow means for letting first molten resin in the first resin-flow-passage flow into the second resin-flow-passage after second molten resin is injected into the cavity through the second resin-flow-passage, the back flow means being operable with a pressure which the first molten resin in the first resin-flow-passage exerts on second molten resin in the second resin-flow-passage.

40 Claims, 21 Drawing Sheets

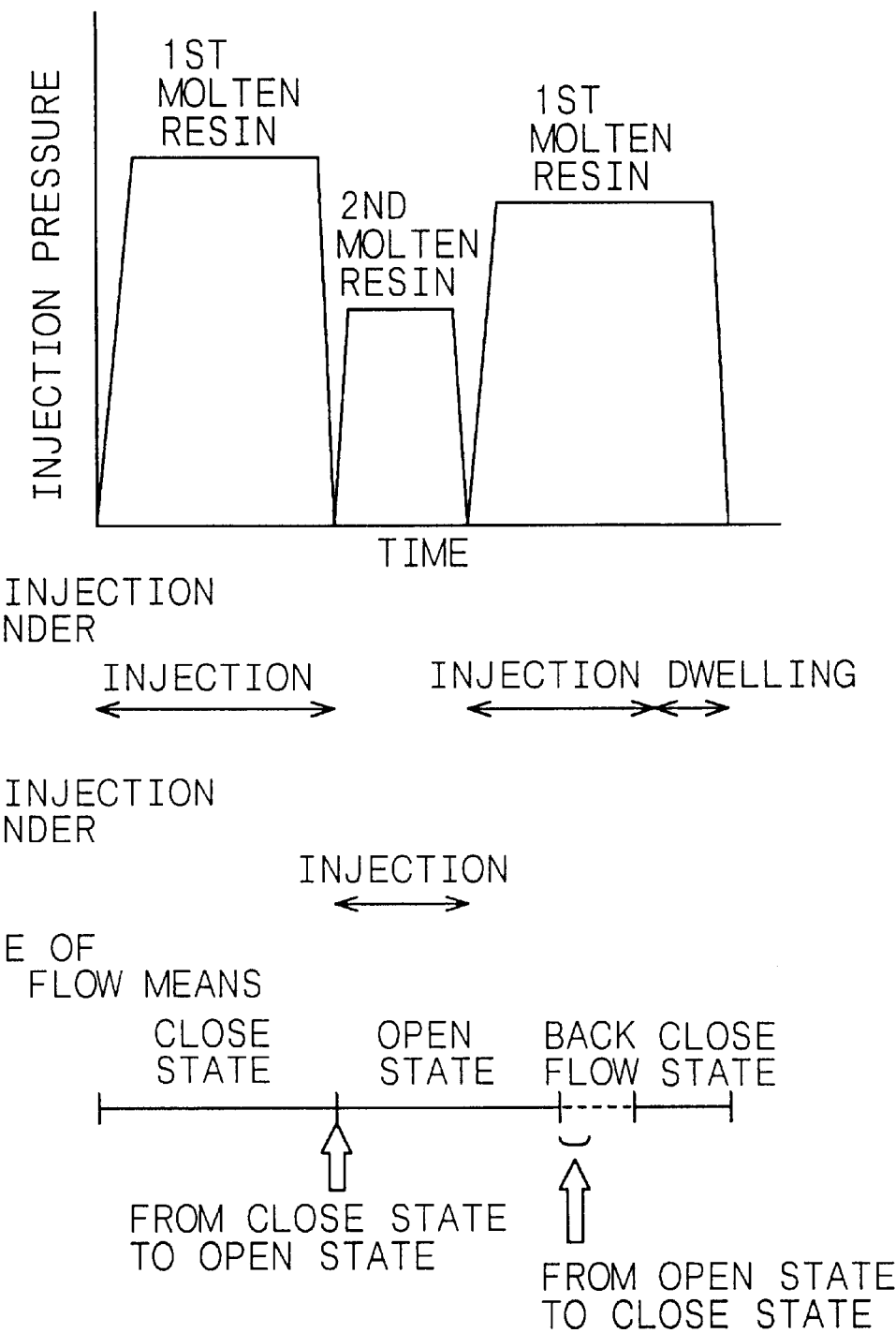

Fig. 17
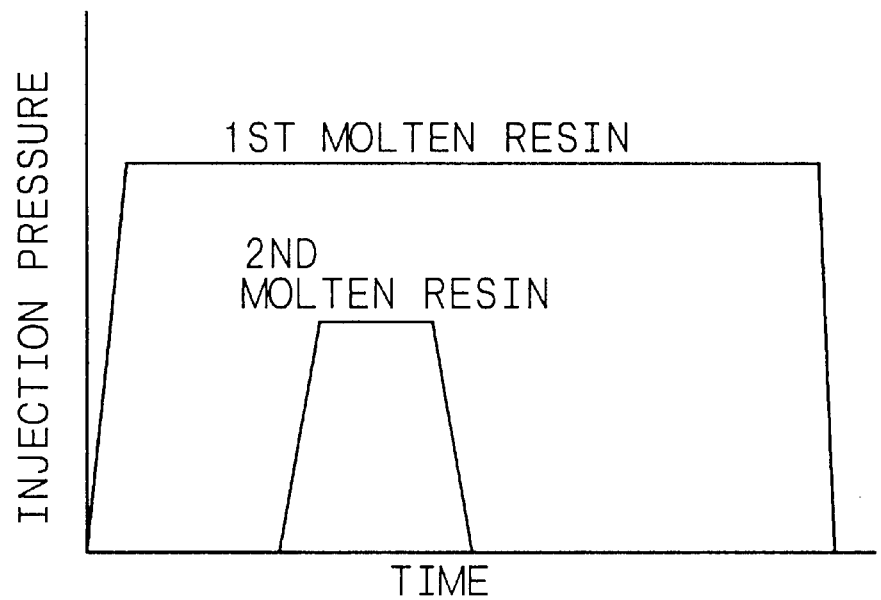
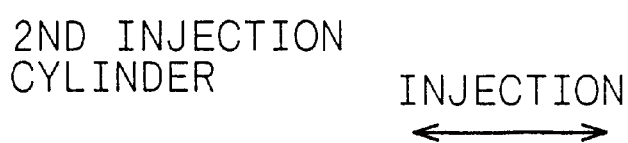
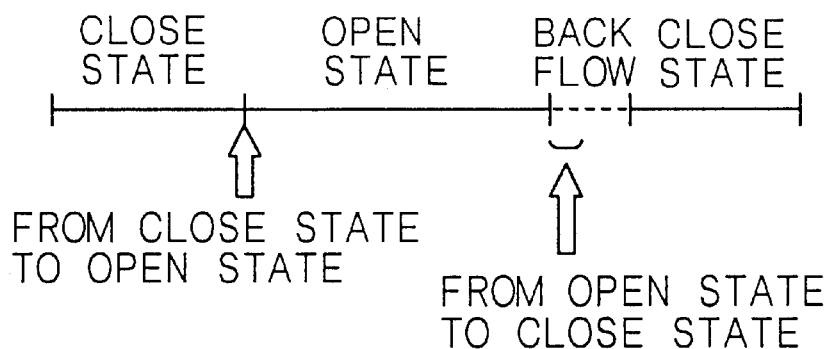

METHOD OF INJECTION MOLDING MULTI-LAYERED ARTICLES

This is a divisional application of Ser. No. 09/158,537, filed Sep. 22, 1998, now U.S. Pat. No. 6,322,344.

BACKGROUND OF THE INVENTION AND RELATED ART

The present invention relates to an injection-molding apparatus for molding a multi-layered article and a method of injection-molding a multi-layered article.

In recent years, containers formed of thermoplastic resins are widely used as containers for cosmetics, foods, beverages and the like. The development of containers formed of a polyethylene terephthalate resin (to be sometimes abbreviated "PET resin", hereinafter) in particular is rapidly advancing owing to improvements in biaxial orientation blow molding technology. However, a container formed of a biaxially oriented thermoplastic polyester resin composed mainly of PET resin does not necessarily have complete performances. That is, when the content to be filled in a container is a food which requires high gas barrier properties against oxygen gas and carbon dioxide gas, and therefore, the container formed of PET resin has a defect that the taste of the contents is impaired. With recent downsizing of containers, the containers are increasingly required to have higher gas barrier properties.

For satisfying the above requirement, JP-A-57-128520 (corresponding to U.S. Pat. No. 4,535,901) discloses a method in which an injection-molding apparatus having two injection cylinders for separately plasticizing and melting a thermoplastic polyester resin and an m-xylylene-group-containing polyamide resin (to be sometimes abbreviated as "MX nylon resin", hereinafter) which is a thermoplastic gas-barrier resin, respectively, and having a single mold is used, and in one molding cycle, the molten thermoplastic polyester resin is injected, the molten MX nylon resin is injected while the molten thermoplastic polyester resin is being injected, and the injection of the molten thermoplastic polyester resin is continued even after completion of injection of the molten MX nylon resin, to form a parison having a three-layer structure of the thermoplastic polyester resin layer/the MX nylon resin layer/the thermoplastic polyester resin layer. The above injection molding method is called a simultaneous-injection molding method.

Further, JP-A-60-240409 (corresponding to EP No. 161625/1985) discloses an injection-molding method similar to the above method, in which, for example, a molten thermoplastic polyester resin and a molten MX nylon resin are injected under specific conditions in the order of the molten thermoplastic resin, the molten MX nylon resin and the thermoplastic polyester resin, to form a parison having a five-layer structure of the thermoplastic polyester resin layer/the MX nylon resin layer/the thermoplastic polyester resin layer/the MX nylon resin layer/the thermoplastic polyester resin layer. The above method is called an alternate-injection molding method.

In recent years, further, a technique is being developed for pelletizing collected containers composed mainly of PET resin and recycling them as a recycled PET resin. When the above recycled PET resin (including a PET resin reclaimed from defective products in the production of parisons and a recycled PET resin once used in the production of parisons) is used to produce parisons for beverage containers, it is required to form a parison having a three-layer structure of the PET resin layer/the recycled PET resin layer/the PET resin layer or a five-layer structure of the PET resin layer/the recycled PET resin layer/the PET resin layer/the recycled PET resin layer/the PET resin layer.

The methods disclosed in the above Japanese Laid-open Patent Publications have enabled the production of multi-layered containers (multi-layered bottles) having an appearance and mechanical performances equivalent to those of a container formed of a polyethylene terephthalate resin and having greatly improved barrier properties against oxygen gas and carbon dioxide gas, and thus-produced containers are now being used.

Conventionally, when a multi-layered molded article (e.g., a multi-layered parison as a precursor of a multi-layered container) formed of two or more resins is produced by virtue of two or more injection cylinders, there is used an injection molding apparatus having a mold provided with a cavity and having two or more injection cylinders. For example, in an injection molding apparatus having two injection cylinders, resin flow-passages (a first resin-flow-passage in which a first molten resin flows and a second resin-flow-passage in which a second molten resin flows) connecting the insides of the injection cylinders to the cavity are structured so as to meet with each other in a junction portion upstream of a gate portion opened to the cavity. Portions of the first and second resin-flow-passages positioned within the mold have a hot runner structure. Further, portions of the first and second resin-flow-passages upstream of the junction portion generally have the structure of a multiple tube. A screw provided in each injection cylinder is generally structured so as to move back when a pressure is exerted from the resin-flow-passage in any case other than the cases of injection of the molten resin and application of a dwell pressure, so that the molten resin in each resin-flow-passage flows back into each injection cylinder.

In the injection molding apparatus having the above structure, when a first molten resin for forming the outermost layer of the multi-layered article is injected into the cavity through the first resin-flow-passage for completely filling the cavity with the first and second molten resins, the first molten resin flowing in the first resin-flow-passage flows into the second resin flow-passage. In this case, the inflow of the first molten resin is not constant. As a result, the amount of the first molten resin to be injected into the cavity is destabilized. Further, during the first injection of the first molten resin, the second molten resin present in the second resin-flow-passage near the junction portion and the first molten resin are injected into the cavity together in a state of a mixture of these resins. There is therefore caused a problem that the second resin which is not to compose the outermost layer of the multi-layered article comes to exist on the outermost layer surface.

For preventing the above flow of the first molten resin into the second resin-flow-passage, a prior art uses a hydraulic shut-off valve provided in a nozzle portion of the injection cylinder which is for injecting second molten resin. Only during the injection of the second molten resin, the shut-off valve is opened, and in any other case, the shut-off valve is closed, whereby the flowing of the first molten resin into the second resin-flow-passage is prevented.

When the flow of a molten resin is controlled by means of the shut-off valve, the flowing of the first molten resin into the second resin-flow-passage can be prevented. However, there is caused the following problem. During the first injection of a first molten resin, the first molten resin and a second molten resin are mixed in the vicinity of the junction portion of the resin-flow-passages, or a second molten resin which is not in an injected state is taken into the first molten resin which is being injected. As a result, the second molten resin present near the junction portion flows into the cavity, and the second resin comes to exist on the surface of the multi-layered article. That is, there is caused a problem that the second resin which is not to compose the outermost layer of the multi-layered article comes to exist on the outermost layer surface.

JP-A-61-206612 (corresponding to U.S. Pat. No. 4,657, 496) discloses a hot liner mold for injection-molding, which has a first resin-flow-passage 11 and a second resin-flow-passage 12, the second resin-flow-passage 12 being provided with a check valve 13. It is said that when a first resin material A is injected, a cavity 22 is completely filled with the resin but that since the second resin-flow-passage 12 is provided with the check valve 13, a second resin material B flows back due to the first resin material A in no case.

OBJECT AND SUMMARY OF THE INVENTION

It is an object of the present invention to provide an injection molding apparatus for producing a multi-layered article which is formed of at least two resins and has resin layers of these resins laminated, and which is structured such that the resin which is not to compose the outermost layer of the multi-layered article can be reliably prevented from coming to exist on the outermost layer surface thereof, in other words, which is structured such that the resin which is not to compose the outermost layer of the multi-layered article is reliably sealed (blocked) with a resin layer composing the outermost layer of the multi-layered article, and a method of injection molding the above multi-layered article.

The above object is achieved by an injection molding apparatus for injection molding a multi-layered article, provided by the present invention, which comprises;
 (a) a mold having a cavity block provided with a cavity and a hot runner block,
 (b) at least a first injection cylinder and a second injection cylinder,
 (c) a first resin-flow-passage for connecting an inside of the first injection cylinder and the cavity, and
 (d) a second resin-flow-passage for connecting an inside of the second injection cylinder and the cavity,
 the injection molding apparatus having a structure in which;
 those portions of the first and second resin-flow-passages which are located within the mold are provided in the hot runner block, and
 the first resin-flow-passage and the second resin-flow-passage meet with each other in a junction portion upstream of a gate portion opened to the cavity,
 the injection molding apparatus being provided with a back flow device for letting first molten resin in the first resin-flow-passage flow into the second resin-flow-passage after second molten resin is injected into the cavity through the second resin-flow-passage,
 the back flow device being operable in response to a pressure which the first molten resin in the first-resin-flow-passage exerts on the second molten resin in the second resin-flow-passage.

In the present specification, the term "upstream" means a position on the injection cylinder 30 side, "downstream" means a position on the cavity side, and these terms will be used in these senses hereinafter.

A method of injection molding a multi-layered article, according to a first aspect of the present invention for achieving the above object, is an alternate-injection molding method for which the above injection molding apparatus of the present invention is applied. That is, the method of injection molding a multi-layered article, according to the first aspect of the present invention for achieving the above object, is a method using an injection molding apparatus which comprises;
 (a) a mold having a cavity block provided with a cavity and a hot runner block,
 (b) at least a first injection cylinder and a second injection cylinder,
 (c) a first resin-flow-passage for connecting an inside of the first injection cylinder and the cavity, and
 (d) a second resin-flow-passage for connecting an inside of the second injection cylinder and the cavity,
 the injection molding apparatus having a structure in which;
 those portions of the first and second resin-flow-passages which are located within the mold are provided in the hot runner block, and
 the first resin-flow-passage and the second resin-flow-passage meet with each other in a junction portion upstream of a gate portion opened to the cavity,
 the injection molding apparatus being provided with a back flow device for letting first molten resin in the first resin-flow-passage flow into the second resin-flow-passage after second molten resin is injected into the cavity through the second-resin-flow-passage,
 the back flow device being operable in response to a pressure which the first molten resin in the first-resin-flow-passage exerts on the second molten resin in the second resin-flow-passage,
 the method comprising the steps of;
 (A) injecting first molten resin prepared in the first injection cylinder into the cavity through the first resin-flow-passage and then discontinuing the injection of the first molten resin,
 (B) injecting second molten resin prepared in the second injection cylinder into the cavity through the second resin-flow-passage and then terminating the injection of the second molten resin, and then,
 (C) injecting first molten resin prepared in the first injection cylinder into the cavity through the first resin-flow-passage and letting first molten resin in the first resin-flow-passage flow into the second resin-flow-passage on the basis of operation of the back flow device during the injection of the first molten resin or after completion of injection of the first molten resin.

In the method of injection molding a multilayered article according to the first aspect of the present invention, although depending upon injection molding conditions, a main portion of the multilayered article may be formed to have a five-layer structure of the first resin layer/the second resin layer/the first resin layer/the second resin layer/the first resin layer. Otherwise, part of a main portion of the multi-layered article may be formed to have a five-layer structure of the first resin layer/the second resin layer/the first resin layer/the second resin layer/the first resin layer, and another part of the main portion of the multi-layered article may be formed to have a three-layer structure of the first resin layer/the second resin layer/the first resin layer. In these cases, a portion other than the main portion of multi-layered article is formed of a layer of the first resin.

FIGS. 14, 15 and 16 show changes of injection pressure, etc., with the lapse of time in the method of injection molding a multi-layered article according to the first aspect of the present invention. In FIGS. 14 to 21, "closed state" in "state of back flow device" means that the inside of the second injection cylinder and the cavity are maintained in a non-communicated state on the basis of operation of the back flow device, and "open state" means that the inside of the second injection cylinder and the cavity are maintained in a communicated state by virtue of the back flow device. "Back flow" means the following. The back flow device is being operated in response to a pressure which the first molten resin in the first resin-flow-passage exerts on the second molten resin in the second resin-flow-passage, so that the first molten resin in the first resin-flow-passage flows into the second resin-flow-passage, and as a result, the second molten resin flows toward the second injection cylinder.

In the method of injection molding a multilayered article according to the first aspect of the present invention, when the first molten resin in the first resin-flow-passage is allowed to flow into the second resin-flow-passage on the basis of operation of the back flow device after completion of injection of the first molten resin, specifically, a dwell pressure is applied with the first injection cylinder, and after the completion of injection of the first molten resin, the back flow device is operated to allow the first molten resin in the first resin-flow-passage to flow into the second resin-flow-passage (see FIG. 16). Further, when the first molten resin in the first resin-flow-passage begins to flow into the second resin-flow-passage on the basis of operation of the back flow device during the injection of the first molten resin, the inflow of the first molten resin into the second resin-flow-passage may be completed during the injection of the first molten resin (see FIG. 14), concurrently with the completion of injection of the first molten resin or during the application of a dwell pressure after completion of injection of the first molten resin (see FIG. 15).

A method of injecting molding a multi-layered article, according to a second aspect of the present invention for achieving the above object, is a simultaneous-injection molding method for which the above injection molding apparatus of the present invention is applied. That is, the method of injection molding a multi-layered article, according to the second aspect of the present invention for achieving the above object, is a method using an injection molding apparatus which comprises;

(a) a mold having a cavity block provided with a cavity and a hot runner block, (b) at least a first injection cylinder and a second injection cylinder, (c) a first resin-flow-passage for connecting an inside of the first injection cylinder and the cavity, and (d) a second resin-flow-passage for connecting an inside of the second injection cylinder and the cavity, the injection molding apparatus having a structure in which;

those portions of the first and second resin flow-passages which are located within the mold are provided in the hot runner block, and the first resin-flow-passage and the second resin-flow-passage meet with each other in a junction portion upstream of a gate portion opened to the cavity, the injection molding apparatus being provided with back flow device for letting first molten resin in the first resin-flow-passage flow into the second resin flow-passage after second molten resin is injected into the cavity through the second resin-flow-passage, the back flow device being operable in response to a pressure which the first molten resin in the first resin-flow-passage exerts on the second molten resin in the second resin-flow-passage, the method comprising the steps of;

(A) injecting first molten resin prepared in the first injection cylinder into the cavity through the first resin-flow-passage, (B) injecting second molten resin prepared in the second injection cylinder into the cavity through the second resin-flow-passage during the injection of the first molten resin, and (C) after completion of injection of the second molten resin, letting first molten resin in the first resin-flow-passage flow into the second resin-flow-passage on the basis of operation of the back flow device during the injection of the first molten resin or after completion of injection of the first molten resin.

FIGS. 17, 18 and 19 show changes of injection pressure, etc., with the lapse of time in the method of injection molding a multi-layered article according to the second aspect of the present invention. When the first molten resin in the first resin-flow-passage is allowed to flow into the second resin-flow-passage on the basis of operation of the back flow device after the completion of injection of the first molten resin, specifically, a dwell pressure is applied with the first injection cylinder, and after completion of injection of the first molten resin, the back flow device is operated to allow the first molten resin in the first resin-flow-passage to flow into the second resin-flow-passage (see FIG. 19). Further, when the first molten resin in the first resin-flow-passage begins to flow into the second resin flow-passage on the basis of operation of the back flow device during the injection of the first molten resin, the inflow of the first molten resin into the second resin-flow-passage may be completed during the injection of the first molten resin (see FIG. 17), concurrently with completion of injection of the first molten resin or during the application of a dwell pressure after completion of injection of the first molten resin (see FIG. 18).

In the method of injection molding a multi-layered article according to the second aspect of the present invention, preferably, in the step (B), the injection amount of the first molten resin per unit time is greater than the injection amount of the second molten resin per unit time. Although depending upon injection molding conditions, a main portion of the multi-layered article may be formed to have a three-layer structure of the first resin layer/the second resin layer/the first resin layer. Otherwise, part of a main portion of the multi-layered article may be formed to have a three-layer structure of the first resin layer/the second resin layer/the first resin layer. In these cases, a portion other than the main portion of the multi-layered article is formed of a layer of the first resin.

The method of injection molding a multi-layered article, according to a third aspect of the present invention for achieving the above object, is an injection molding method for which the above injection molding apparatus of the present invention is applied, the method comprising the steps of;

(A) injecting first molten resin prepared in the first injection cylinder into the cavity through the first resin-flow-passage and then terminating the injection of the first molten resin, (B)

injecting second molten resin prepared in the second injection cylinder into the cavity through the second resin-flow-passage and then terminating the injection of the second molten resin, and (C) applying a dwell pressure with the first injection cylinder and letting first molten resin in the first resin-flow-passage flow into the second resin-flow-passage on the basis of operation of the back flow device.

FIG. 20 shows changes of injection pressure, etc., with the lapse of time in the method of injection molding a multi-layered article according to the third aspect of the present invention.

The method of injection molding a multi-layered article, according to a fourth aspect of the present invention for achieving the above object, is an injection molding method for which the above injection molding apparatus of the present invention is applied, the method comprising the steps of;

(A) injecting first molten resin prepared in the first injection cylinder into the cavity through the first resin-flow-passage, (B) injecting second molten resin prepared in the second injection cylinder into the cavity through the second resin-flow-passage during the injection of the first molten resin, (C) terminating the injection of the first molten resin and the injection of the second molten resin almost at the same time, then, applying a dwell pressure with the first injection cylinder, and letting first molten resin in the first resin-flow-passage flow into the second resin-flow-passage on the basis of operation of the back flow device.

FIG. 21 shows changes of injection pressure, etc., with the lapse of time in the method of injection molding a multi-layered article according to the fourth aspect of the present invention.

In the injection molding apparatus for injection molding a multi-layered article according to the present invention, or in the method of injection molding a multi-layered article according to any one of the first to fourth aspects of the present invention, preferably, the back flow device (counter-flow device) allows a constant amount of the first molten resin in the first resin-flow-passage to flow into the second resin-flow-passage. Preferably, further, when second molten resin is being injected into the cavity through the second resin-flow-passage and after the injection of the second molten resin is completed, the inside of the second injection cylinder and the cavity are brought into a communicated state by virtue of the back flow device, and after a predetermined amount of the first molten resin in the first resin-flow-passage is allowed to flow into the second resin-flow-passage, the inside of the second injection cylinder and the cavity are brought into a non-communicated state on the basis of operation of the back flow device. "Predetermined amount" and "constant amount" have a relationship of (predetermined amount)≦(constant amount). Alternatively, preferably, when second molten resin is being injected into the cavity through the second resin-flow-passage and after the injection of the second molten resin is completed, the inside of the second injection cylinder and the cavity are brought into a communicated state by virtue of the back flow device, and after the first molten resin in the first resin-flow-passage begins to flow into the second resin-flow-passage, the inside of the second injection cylinder and the cavity are brought into a non-communicated state on the basis of operation of the back flow device.

In the injection molding apparatus for injection molding a multi-layered article according to the present invention, or in the method of injection molding a multi-layered article according to any one of the first to fourth aspects of the present invention, preferably, the back flow device is provided in that part of the second resin-flow-passage which is between the junction portion of the first and second resin-flow passages and the second injection cylinder. In this case, particularly preferably, the back flow device is provided between the nozzle portion of the second injection cylinder and the mold, or in the nozzle portion of the second injection cylinder.

In the injection molding apparatus for injection molding a multi-layered article according to the present invention, or in the method of injection molding a multi-layered article according to any one of the first to fourth aspects of the present invention, preferably, the back flow device is a back flow control valve (a counter-flow control valve) from the viewpoint of allowing a constant amount of the first molten resin to flow into the second resin-flow-passage and from the viewpoint of structural simplification. The back flow control valve includes a ball-type back flow control valve and a sliding valve-type back flow control valve.

In the injection molding apparatus for injection molding a multi-layered article according to the present invention, or in the method of injection molding a multi-layered article according to any one of the first to fourth aspects of the present invention, the volume of the first molten resin which is allowed to flow into the second resin-flow-passage is 5 to 50%, preferably 5 to 35%, more preferably 5 to 25%, based on the cavity volume. When the volume of the first molten resin which is allowed to flow into the second resin-flow-passage is less than 5% based on the cavity volume, it is difficult to prevent the resin which is not to compose the outermost layer of a multi-layered article from coming to exist on the outermost layer surface thereof. Although depending upon injection conditions, the resin layers composing the layers of a multi-layered article undergo turbulence since the first molten resin is allowed to flow into the second resin-flow-passage. For reliably preventing the above turbulence, the volume of the first molten resin which is allowed to flow into the second resin-flow-passage is preferably 35% or less, particularly preferably, 25% or less, based on the cavity volume. When the above amount of the first molten resin exceeds 50% based on the cavity volume, the resin layers composing the layers of a multi-layered article may have a turbulence which is a practical problem in many cases.

In the injection molding apparatus for injection molding a multi-layered article according to the present invention, or in the method of injection molding a multi-layered article according to any one of the first to fourth aspects of the present invention, the multi-layered article may have any structure or form, and it includes a parison as a precursor for forming a multi-layered container (multi-layered bottle). In this case, the outermost layer of the parison is preferably formed of the first molten resin injected into the cavity through the first resin-flow-passage. Further, in addition to the parison, the multi-layered article includes a bumper and a steering wheel for an automobile. Further, the multi-layered article also includes a multi-layered article formed by combining a plurality of resins for imparting it with different functions such as strength, an appearance and the like, on the basis of a multi-layer forming technique.

In the method of injection molding a multi-layered article according to any one of the first to fourth aspects of the present invention, the second resin is at least one resin selected from the group consisting of a thermoplastic resin having gas barrier properties (gas-barrier resin), a recycled polyethylene terephthalate resin (including a polyethylene terephthalate resin reclaimed from a resin once used in the production of parisons) and a colored polyethylene terephthalate resin.

The above gas-barrier resin is preferably at least one resin selected from the group consisting of a m-xylylene-group-containing polyamide resin (MX nylon resin), a saponification product of an ethylene-vinyl acetate copolymer resin, a polyacrylonitrile resin and a polyvinylidene chloride resin. Of these resins, MX nylon resin is particularly preferred.

The above MX nylon resin refers to a polymer containing at least 70% of structural units obtained from m-xylylenediamine alone, or a xylylenediamine mixture of m-xylylenediamine with 30% or less of p-xylylenediamine, and an a o-aliphatic dicarboxylic acid having 6 to 10 carbon atoms. Examples of the above polymer include homopolymers such as poly-m-xylyleneadipamide, poly-m-xylylenesebacamide and poly-m-xylylenesuberamide; copolymers such as a m-xylylene/p-xylyleneadipamide copolymer and m-xylylene/p-xylylenesuberamide copolymer; and copolymers obtained from the above hompolymer or copolymer components and aliphatic daimines such as hexamethylenediamine, alicyclic diamines such as piperazine, aromatic diamines such as p-bis-(2-aminoethyl) benzene, aromatic dicarboxilic acids such as terephthalic acid, lactams such as $\epsilon$-caprolactam, $\omega$-aminocarboxylic acids such as $\omega$-aminoheptanoic acid or aromatic aminocarboxylic acids such as p-aminobenzoic acid. The above polymers may contain polymers such as nylon 6, nylon 6, nylon 610 or nylon 11.

The relative viscosity of the MX nylon resin is properly at least 1.5, preferably 2.0 to 4.0. The relative viscosity ($\eta_{rel}$) is a viscosity measured at 25° C. under a condition of resin 1 gram/96% sulfuric acid 100 ml.

In the method of injection molding a multi-layered article according to any one of the first to fourth aspects of the present invention, the first resin is at least one resin selected from the group consisting of thermoplastic polyester resins such as polyethylene terephthalate and polyethylene-2,6-naphthalate; a thermoplastic copolyester resin; a polyolefin resin; an aliphatic polyamide resin; a polycarbonate resin; a polyacrylonitrile resin; a polyvinyl chloride resin; and a polystyrene resin. Of these, thermoplastic polyester resins are preferred. Further, a blend prepared by blending two or more resins, e.g., a blend prepared by blending a polyethylene terephthalate resin and a polyethylene-2,6-naphthalate resin may be used as required.

The above polyethylene terephthalate refers to a polyester obtained from an acid component containing at least 80 mol %, preferably at least 90 mol %, of terephthalic acid and a glycol component containing at least 80 mol %, preferably at least 90 mol %, of ethylene glycol. The balance of the acid component is selected from isophthalic acid, diphenyl ether-4,4-dicarboxylic acid, naphthalene-1,4, or 2,6-dicarboxylic acid, adipic acid, sebacic acid, decane-1,10-decarboxylic acid and hexahydroterephthalic acid. The balance of the glycol component is selected from propylene glycol, 1,4-butanediol, neopentyl glycol, diethylene glycol, cyclohexanedimethanol and 2,2-bis(4-hydroxyethoxyphenyl) propane. Further, there may be used a polyester resin containing p-hydroxybenzoic acid as a hydroxy acid.

Further, the polyethylene-2,6-naphthalate may contain other ester-forming units in an amount of 20 mol % or less, preferably 10 mol % or less in addition to ethylene-2,6-naphthalenedicarboxylate. A dicarboxylic acid for forming the "other" ester-forming units preferably includes aromatic dicarboxylic acids such as phthalic acid, isophthalic acid, terephthalic acid, 1,4-naphthalenedicarboxylic acid, 1,5-naphthalenedicarboxylic acid, 2,5-naphthalenedicarboxylic acid, 2,7-naphthalenedicarboxylic acid, 4,4'-diphenylcarboxylic acid and 3,4'-diphenylcarboxylic acid; aliphatic dicarboxylic acids such as succinic acid, adipic acid, sebacic acid and dodecanedioic acid; and aliphatic dicarboxylic acids such as 1,4-cyclohexanedicarboxylic acid, 1,3-cyclohexanedicarboxylic acid, decalindicarboxylic acid and tetralindicarboxylic acid. A diol for forming the "other" ester-forming units preferably includes aliphatic glycols such as propylene glycol, trimethylene glycol, diethylene glycol and 1,4-butanediol; aliphatic glycols such as 1,3-cyclohexanedimethanol, 1,4-cyclohexanedimethanol and 1,6-cyclohexanediol; and aromatic glycols such as bisphenol A. The above polyethylene-2,6-naphthalate may have a molecule whose terminal is blocked with a small amount of a monofunctional compound such as benzoic acid, benzoylbenzoic acid, benzyloxybenzoic acid or methoxypolyethylene glycol. Further, it may contain a small amount of a polyfunctional compound such as glycerin, trimesic acid or pentaerythritol.

The intrinsic viscosity of the above thermoplastic polyester resin is properly at least 0.40, preferably 0.50 to 1.4. When the above intrinsic viscosity is less than 0.40, an obtained multi-layered article (e.g., multi-layered bottle) is poor in mechanical strength, and further, it is difficult to produce, e.g., a multi-layered article in an amorphous and transparent state. The "intrinsic viscosity ($\eta$)" is a viscosity measured at 30° C. using mixed solvents of phenol/tetrachloroethane=6.4 (weight ratio).

The above thermoplastic copolyester resin refers to a copolyester resin obtained by copolymerizing at least one acid component and at least one diol component. The acid component is selected from terephthalic acid, isophthalic acid, 1,4-naphthalenedicarboxylic acid, 1,5-naphthalenedicarboxylic acid, 2,5-naphthalenedicarboxylic acid, 2,6-naphthalenedicarboxylic acid and 2,7-naphthalenedicarboxylic acid. The diol component is selected from ethylene glycol, propylene glycol, 1,3-cyclohexanedimethanol, 1,4-cyclohexanedimethanol, 1,3-bis(2-hydroxyethoxy)benzene, and 1,4-bis(2-hydroxyethoxy)benzene. The above thermoplastic copolymer resin may be used with other thermoplastic polyester resin as required.

In the method of injection molding a multi-layered article according to any one of the first to fourth aspects of the present invention, a combination of a thermoplastic polyester resin, particularly, a polyethylene terephthalate resin (PET resin), with MX nylon resin is most preferred, since these resins are excellent in all of transparency, mechanical strength, injection moldability and stretch blow moldability. Further, since these two resins have similar thermal properties, it is easy to determine molding temperature conditions. In this case, preferably, the polyethylene terephthalate resin and the MX nylon resin have melt viscosity values close to each other. For example, when a polyethylene terephthalate resin having an intrinsic viscosity of 0.7 to 0:8 is used, it is desirable to use an MX nylon resin having a relative viscosity of approximately 2.7. When another gas-barrier resin is used, preferably, the gas-barrier resin has a melt viscosity close to the melt viscosity of the polyethylene terephthalate resin.

In the method of injection molding a multi-layered article according to any one of the first to fourth aspects of the present invention, further, the first resin, the second resin or each of resins forming a multi-layered article may contain a colorant, an ultraviolet absorbent, an antistatic agent, an antioxidant, a lubricant, a nucleating agent, a bactericide and a fungicide.

The injection molding apparatus of the present invention is provided with the back flow device for allowing first molten resin in the first resin-flow-passage to flow into the second resin-flow-passage. When first molten resin is injected into the cavity, therefore, first molten resin (which has flowed into the second resin-flow-passage in a previous molding cycle) has been present in that portion of the second resin-flow-passage which is near the junction portion of the resin-flow-passages. Therefore, a phenomenon that first molten resin to be injected is mixed with second molten resin in the second resin-flow-passage in the vicinity of the junction portion can be prevented, and a phenomenon that second molten resin which is not in an injected state is taken into first molten resin which is being injected can be prevented. As a result, there can be reliably prevented a problem that second resin comes to exist on the surface of a multi-layered article.

In the method of injection molding a multilayered article according to any one of the first to fourth aspects of the present invention, the injection molding apparatus of the present invention is used which is provided with the back device for allowing first molten resin in the first resin-flow-passage to flow into the second resin-flow-passage. When first molten resin is injected into the cavity in the step (A), therefore, first molten resin (which has flowed into the second resin-flow-passage in a previous molding cycle) has been present in that portion of the second resin-flow-passage which is near the junction portion of the resin-flow-passages. Therefore, a phenomenon that first molten resin to be injected is mixed with second molten resin in the second resin-flow-passage in the vicinity of the junction portion can be prevented, and a phenomenon that second molten resin which is not in an injected state is taken into first molten resin which is being injected can be prevented. As a result, there can be reliably prevented a problem that second resin comes to exist on the surface of a multi-layered article.

In the present invention, the back flow device constituted of a back flow control valve (a counter-flow control valve) can avoid an increase in the size of an injection molding apparatus and a complication of the apparatus, and prevents the leakage of molten resin from the resin-flow-passages. When a ball-type back flow control value is used as a back flow control valve, nothing but a ball moves under a fluid pressure, the back flow control valve is structurally simple, and neither a movable part nor a sliding part is present. The control of a fluid with a ball-type back flow control valve can be applied not only to the flow of a molten resin but also to the flow of each of a liquid and a gas. When a conventional shut-off valve is used, an electromagnetic valve or cylinder is operated with an external hydraulic pressure or air pressure, and the flow passage of a fluid is forcibly opened and closed with the rotation or reciprocal movement thereof. Therefore, the conventional shut-off valve is structurally complicated and has poor durability.

BRIEF DESCRIPTION OF THE DRAWINGS

The present invention will be explained in detail with reference to drawings hereinafter.

FIGS. 14, 15 and 16 are graphs showing changes of an injection pressure, etc., with the lapse of time in the method of injection molding a multi-layered article according to the first aspect of the present invention.

FIGS. 17, 18 and 19 are graphs showing changes of an injection pressure, etc., with the lapse of time in the method of injection molding a multi-layered article according to the second aspect of the present invention.

DESCRIPTION OF THE PREFERRED EMBODIMENTS

EXAMPLE 1

Figure 1:
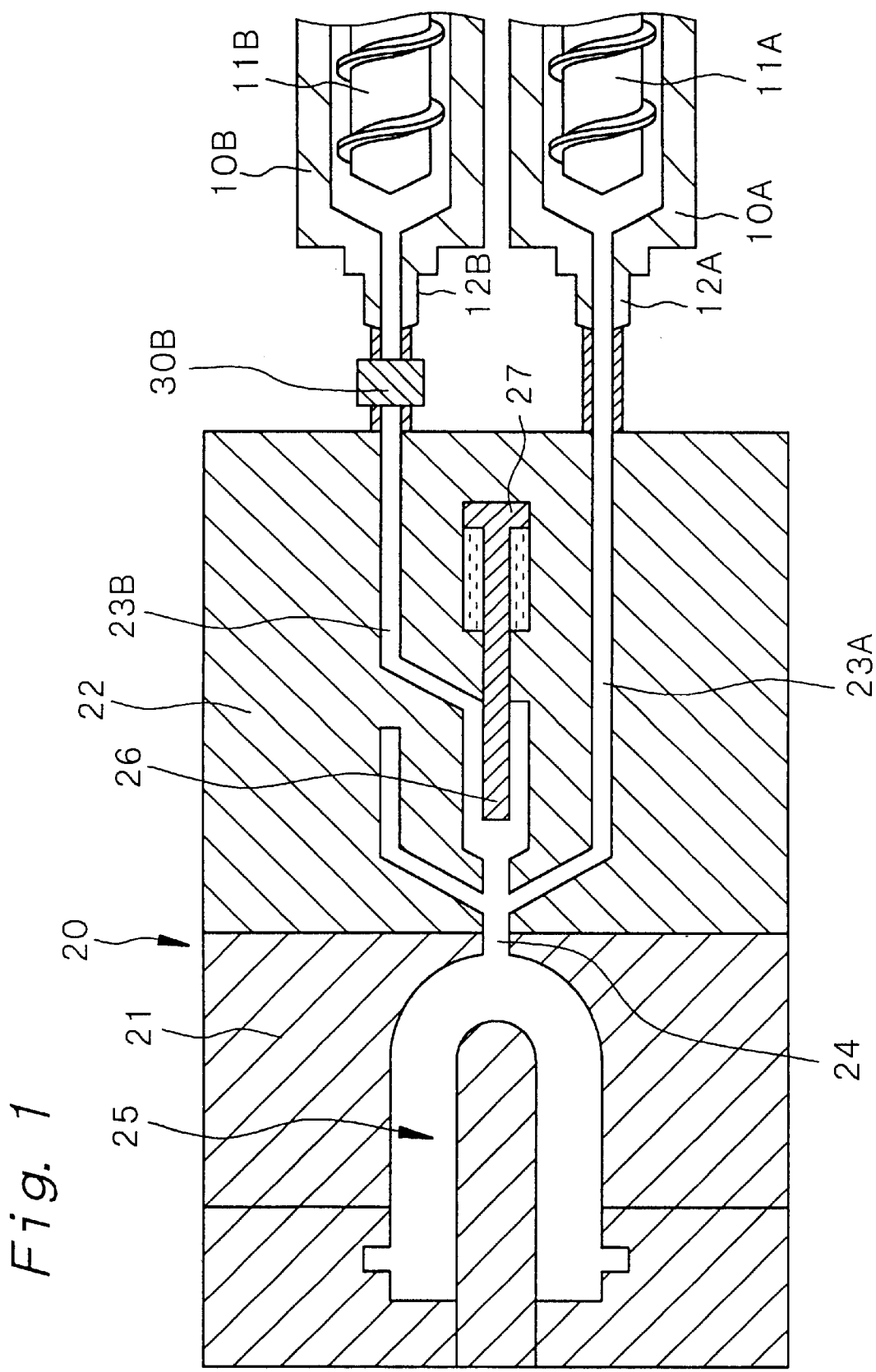
FIGS. 1 and 2 schematically show an injection molding apparatus used in Example 1.
Figure 2:
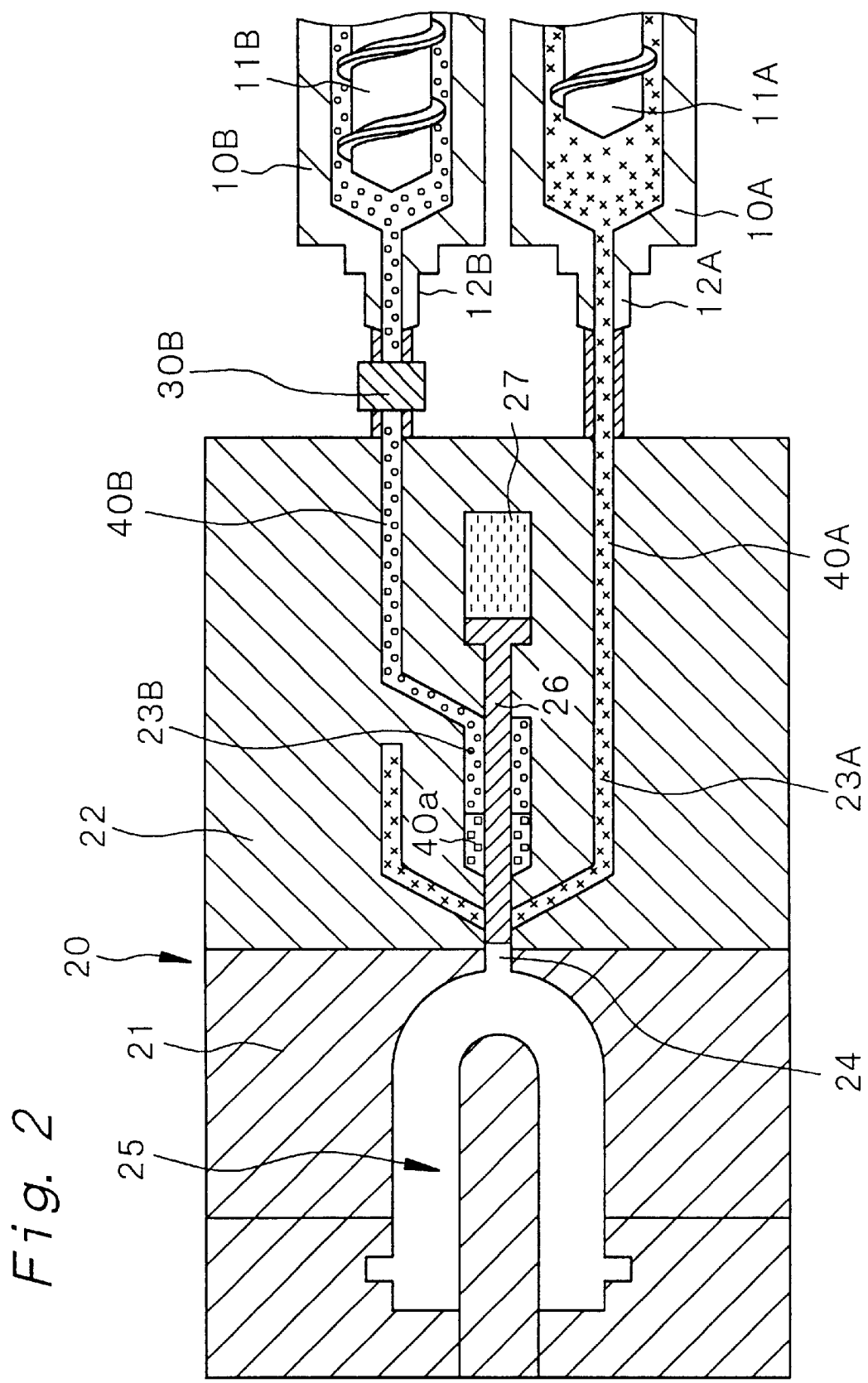

FIGS. 1 and 2 schematically show an injection molding apparatus for injection molding a multi-layered article (to be simply referred to as "injection molding apparatus" hereinafter) in Example 1. FIG. 1 shows the injection molding apparatus in a state where no injection molding is carried out, and FIG. 2 shows the injection molding apparatus in a state where the metering of a first molten resin 40A and a second molten resin 40B is finished immediately before the injection molding of a multi-layered article.

The injection molding apparatus has a mold 20, two injection cylinders 10A and 10B, a first resin-flow-passage 23A for connecting an inside of the first injection cylinder 10A and a cavity 25 and a second resin-flow-passage 23B for connecting an inside of the second injection cylinder 10B and the cavity 25. The mold 20 is composed of a cavity block 21 provided with the cavity 25 and a hot runner block 22. The cavity block 21 is composed of a combination of a plurality of block members. Those portions of the first resin-flow-passage 23A and the second resin-flow-passage 23B which are located in the mold 20 are provided in the hot runner block 22. Further, the first resin-flow-passage 23A and the second resin-flow-passage 23B are structured so as to meet with each other in a junction portion upstream of a gate portion 24 which is opened to the cavity 25. Further, reference numerals 12A and 12B show nozzle portions of the first and second injection cylinders 10A and 10B, respectively. That part of each of the first and second resin-flow-passages 23A and 23B which is positioned upstream of the junction portion of the first and second resin-flow-passages 23A and 23B (on the injection cylinder side) has a dual (double) tube structure. The tubular second resin-flow-passage 23B inside the dual tube structure is provided with a gate cut pin 26 inside. The gate cut pin 26 is movable in a direction near to, and far from, the cavity 25 by the actuation of an air cylinder 27. The communication between the tubular first resin-flow-passage 23A on the outer side of the dual tube structure and the cavity 25 and the communication between the tubular second resin-flow-passage 23B on an inner side of the dual tube structure and the cavity 25 can be controlled on the basis of movement of the gate cut pin 26. That is, when the gate cut pin 26 is moved to a forward end, the communication between the first resin-flow-passage 23A and the cavity 25 and the communication between the second resin-flow-passage 23B and the cavity 25 are blocked. Further, when the gate cut pin 26 is moved to a backward end, the communication between the first resin-flow-passage 23A and the cavity 25 and the communication between the second resin-flow-passage 23B and the cavity 25 are secured. FIG. 1 shows a state where the gate cut pin 26 is withdrawn from the gate portion 24 (positioned in the backward end). FIG. 2 shows a state where the gate cut pin 26 is inserted in the gate portion 24 (positioned in the forward end). In FIG. 2, reference numeral 40A shows a first molten resin to be injected from the first injection cylinder 10A to the cavity 25 through the first resin-flow-passage 23A and the gate portion, 24 and reference numeral 40B shows a second molten resin to be injected from the second injection cylinder 10B to the cavity 25 through the second resin-flow-passage 23B and the gate portion 24. Further, reference numeral 40a shows remaining molten resin 40A which has flowed into to be left in the second resin-flow-passage 23B in a previous molding cycle (shown by blank squares in FIG. 2). The cavity block 21 has a tubing for flowing water inside and the hot runner block 22 has a heater inside, while the tubing and the heater are not shown.

The injection molding apparatus of the present invention is provided with a back flow device for allowing a constant amount of the first molten resin 40A in the first resin-flow-passage 23A to flow into the second resin flow-passage 23B after the second molten resin 40B is injected into the cavity 25 through the second resin flow-passage 23B. The back flow device is operated in response to a pressure which the first molten resin 40A in the first resin-flow-passage 23A exerts on the second molten resin 40B in the second resin-flow-passage 23B. In the injection molding apparatus in Example 1, the back flow device is a back flow control valve provided in that portion of the resin-flow-passage 23B which is upstream of the junction portion of the first and second resin-flow-passages 23A and 23B. Specifically, the back flow control valve is a ball-type back flow control valve 30B. In FIGS. 1 and 2, the back flow control valve 30B is disposed between the nozzle portion 12B of the second injection cylinder 10B and the mold 20, while it may be disposed in the nozzle portion 12B.

A conventional ball check valve is provided for preventing back flow of a molten resin. In contrast, the back flow control valve 30B in Example 1 is structured so as to be capable of allowing a constant amount of second molten resin 40B to flow back. Specifically, the back flow control valve 30B is composed of a cylindrical tube portion 31 having a hollow portion 32 and a ball 34 housed in the hollow portion 32, as shown in the schematic end view of FIG. 6A. That predetermined portion of the hollow portion 32 which is located from the end portion of the hollow portion 32 (on the mold side) toward the upstream side of the hollow portion 32 has a larger diameter than the ball 34. The above predetermined portion of the hollow portion 32 is called a diameter-enlarged portion 33. Another portion of the hollow portion 32 has a diameter nearly equal to the diameter of the ball 34.

Figure 6A:
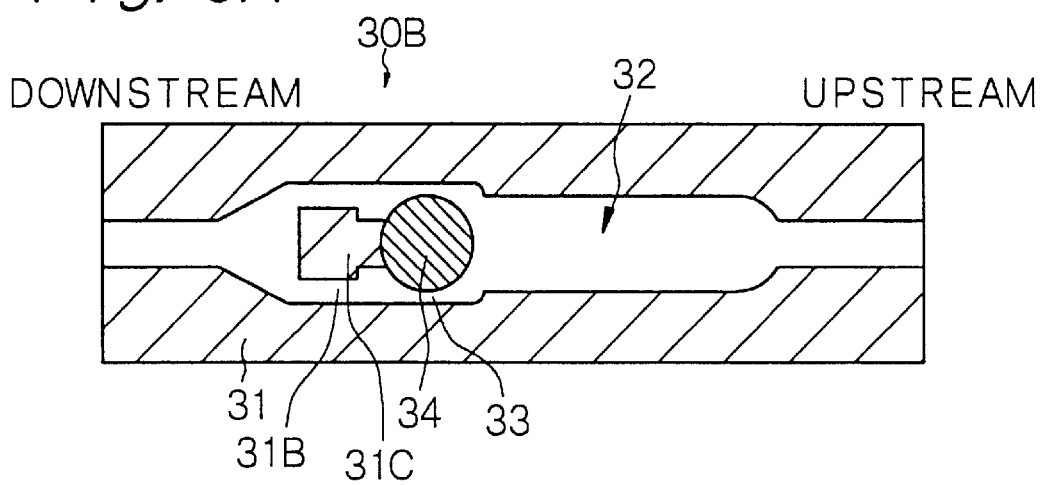
FIGS. 6A, 6B and 6C are schematic end views of a ball-type back flow control valve as a back flow device in Example 1.
Figure 6B:
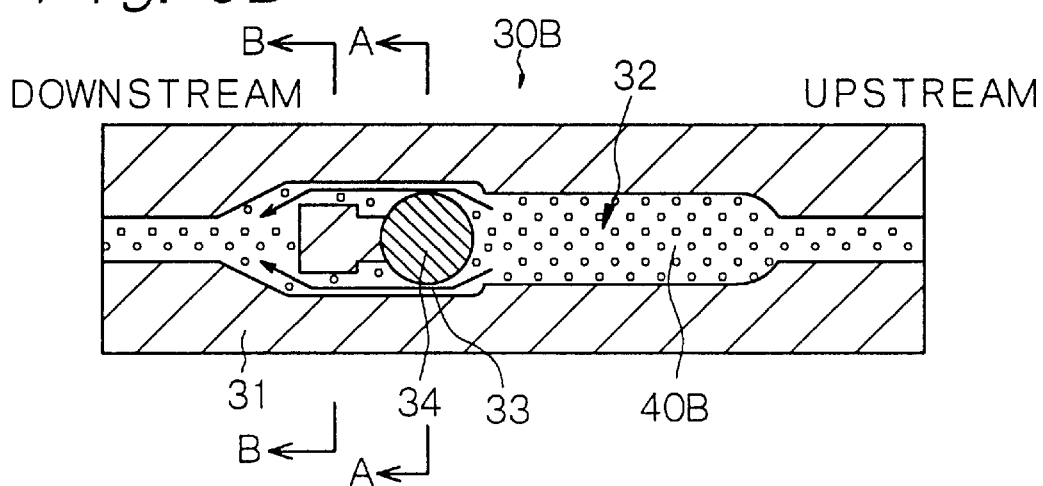

When second molten resin 40B is forwarded from the second injection cylinder 10B to the cavity 25, the ball 34 is pushed to the diameter-enlarged portion 33 on the downstream end side of the hollow portion 32 in response to the pressure of the second molten resin 40B as shown in FIG. 6B. When the second molten resin 40B is injected to the cavity 25 through the second resin-flow-passage 23B and after the injection is completed, therefore, the inside of the second injection cylinder 10B and the cavity 25 are brought into a communicated state by virtue of the back flow control valve 30B. The second molten resin 40B flows toward the cavity 25 through a gap between the ball 34 and the diameter-enlarged portion 33.

Figure 6C:
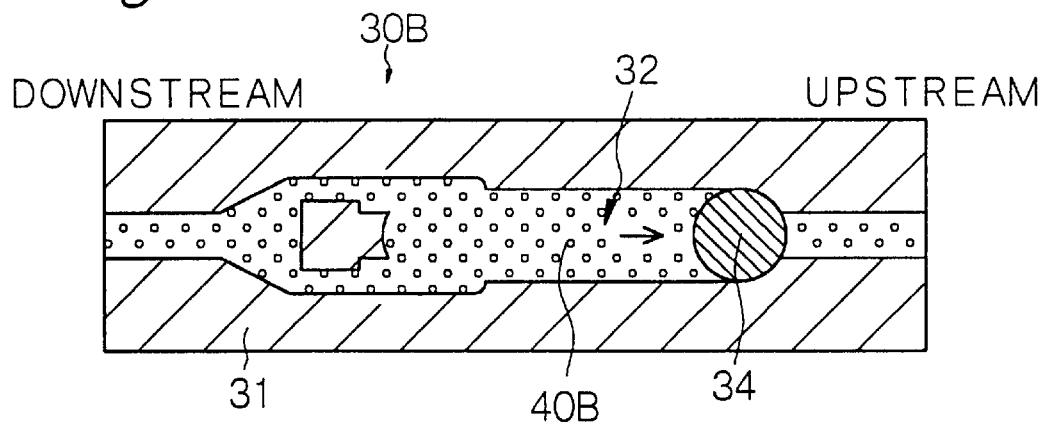

On the other hand, second molten resin 40B flows back due to a pressure which the first molten resin 40A in the first resin-flow-passage 23A exerts on the molten resin 40B in the second resin-flow-passage 23B. And, when the second molten resin 40B flows back through the back flow control valve 30B, the ball 34 is moved toward the upstream end portion of the hollow portion 32 by the pressure of the second molten resin 40B which is flowing back, and finally, the ball 34 is pushed to the upstream end portion of the hollow portion 32 (see FIG. 6C). There is no gap between the ball 34 and the upstream end portion of the hollow portion 32. In a state shown in FIG. 6C, therefore, no further back flow of the second molten resin 40B takes place. In other words, while the ball 34 is moving from the diameter-enlarged portion 33 of the cylindrical tube portion 31 to the upstream end portion of the hollow portion 32, the second molten resin 40B flows back through the back flow control valve 30B. Generally, the volume of the second molten resin 40B which flows back is approximately defined by a product of the cross sectional area of the ball 34 and the movement distance of the ball 34 and is a constant amount. In other words, generally, the volume of the second molten resin 40B which flows back is nearly equal to a volume obtained by deducting the volume of the ball 34 from the volume of the hollow portion 32, and is a constant amount. The volume of the first molten resin 40A which flows into the second resin-flow-passage 23B can be defined by properly selecting and determining the diameter of the ball 34 and the movement distance of the ball 34. That is, it is sufficient to properly select and determine the diameter of the ball 34 and the movement distance of the ball 34 such that the volume of the first molten resin 40A which flows into the second resin-flow-passage 23B is 5 to 50%, preferably 5 to 35%, more preferably 5 to 25%, based on the cavity volume. In other words, the product of the cross sectional area of the ball 34 and the movement distance of the ball 34 is nearly equal to the volume of the first molten resin 40A which flows into the second resin-flow-passage 23B. In FIGS. 6B and 6C, arrows show directions in which the second molten resin 40B flows.

The first molten resin 40A in the first resin-flow-passage 23A begins to flow into the second resin-flow-passage 23B, and the ball 34 begins to move from the diameter-enlarged portion 33 of the cylindrical tube portion 31 to the upstream end portion of the hollow portion 32. When the predetermined amount of the first molten resin 40A in the first resin-flow-passage 23A flows into the second resin-flow-passage 23B, the ball 34 reaches the boundary between the diameter-enlarged portion 33 and the another portion of the hollow portion 32. The inside of the second injection cylinder 10B and the cavity 25 are brought into a non-communicated state by virtue of the back flow control valve 30B at a point of time when the ball 34 moves into the another portion of the hollow portion 32, since the portion of the hollow portion 32 other than the diameter-enlarged portion 33 has a diameter nearly equal to the diameter of the ball 34.

Figure 7A:
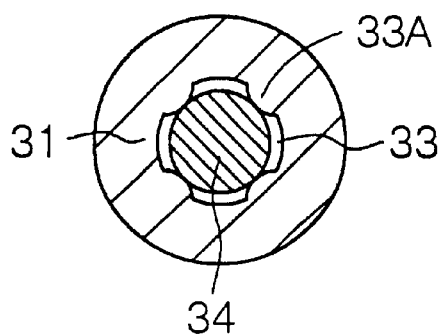
FIGS. 7A, 7B, 7C and 7D are schematic cross-sectional views of a cylindrical tube portion taken along a line A—A in FIG. 6B, and FIGS. 7E, 7F, 7G and 7H are schematic cross-sectional views of a cylindrical tube portion taken along a line B—B in FIG. 6B.
Figure 7B:
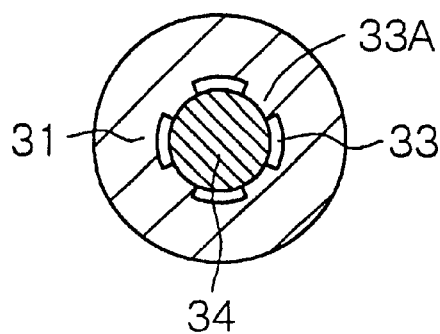
Figure 7C:
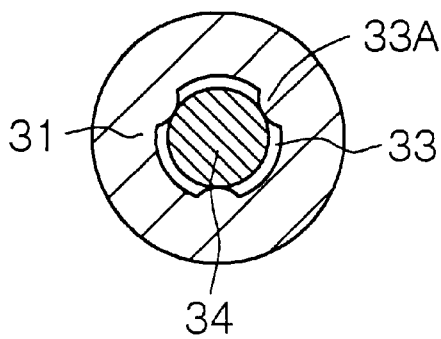
Figure 7D:
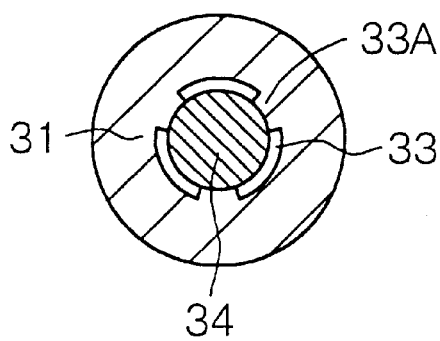
Figure 7E:
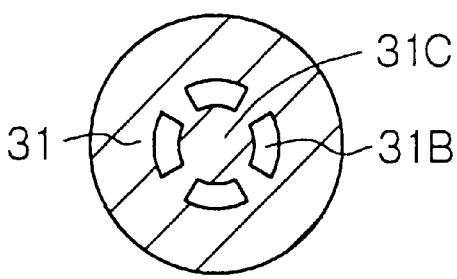
Figure 7F:
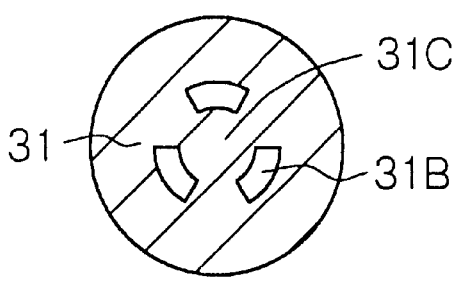
Figure 7G:
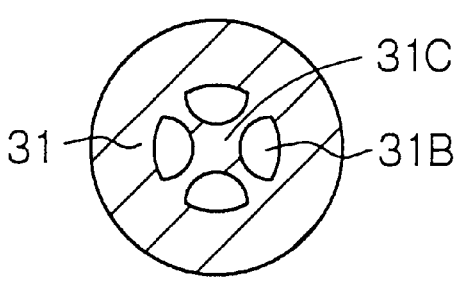
Figure 7H:
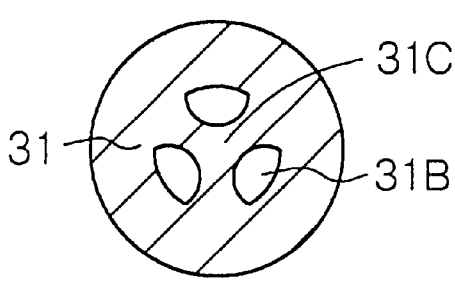

FIGS. 7A and 7B show schematic cross-sectional views of the cylindrical tube portion taken along a line A—A in FIG. 6B. In structures shown in FIGS. 7A and 7B, protrusions 33A extend from four places of an inner surface of the diameter-enlarged portion 33 of the cylindrical tube portion 31 near to a ball receptor 31C in parallel with an axial line of the cylindrical tube portion 31, and the ball 34 moves while it is kept in contact with the top end or top end surface of each protrusion 33A. FIGS. 7C and 7D show variants of the diameter-enlarged portion 33 of the cylindrical tube portion 31 taken along the line A—A in FIG. 6B. In structures shown in FIGS. 7C and 7D, protrusions 33A extend from three places of the inner surface of the diameter-enlarged portion 33 of the cylindrical tube portion 31 near to the ball receptor 31C in parallel with the axial line of the cylindrical tube portion 31. In structures shown in FIGS. 7A and 7C, each protrusion 33A has a cross-sectional form obtained by cutting off part of a circle. In structures shown in FIGS. 7B and 7D, each protrusion 33A has a nearly rectangular cross-sectional form. The second molten resin 40B flows through a space surrounded by the ball 34, the protrusions 33A and inner surfaces of the diameter-enlarged portion 33. The cross-sectional forms of the protrusions 33A, the number of the protrusions 33A and the form of the above space obtained by cutting the space with a plane perpendicular to the axial line of the cylindrical tube portion 31 shall not be limited to those shown in FIGS. 7A to 7D. Further, FIG. 7E shows a schematic cross-sectional view of the ball receptor 31C taken along a line B—B in FIG. 6B. Further, FIGS. 7F, 7G and 7H show schematic cross-sectional views of variants of that part of the ball receptor 31C which is taken along the line B—B in FIG. 6B. As shown in FIGS. 7E to 7H, spaces 31B extending in the direction in parallel with the axial line of the cylindrical tube portion 31 are provided between the ball receptor 31C in the downstream end portion of the hollow portion 32 and the cylindrical tube portion 31, wherein each space 31B is in communication with the diameter-enlarged portion 33, and the second molten resin 40B flows in each space 31B. The ball receptor 31C and the cylindrical tube portion 31 may be integrally produced, or they may be separately produced. The number of the above spaces 31B and the form of the above spaces 31B obtained by cutting the spaces 31B with a plane perpendicular to the axial line of the cylindrical tube portion 31 shall not be limited to those shown in FIGS. 7E to 7H.

Figure 8:
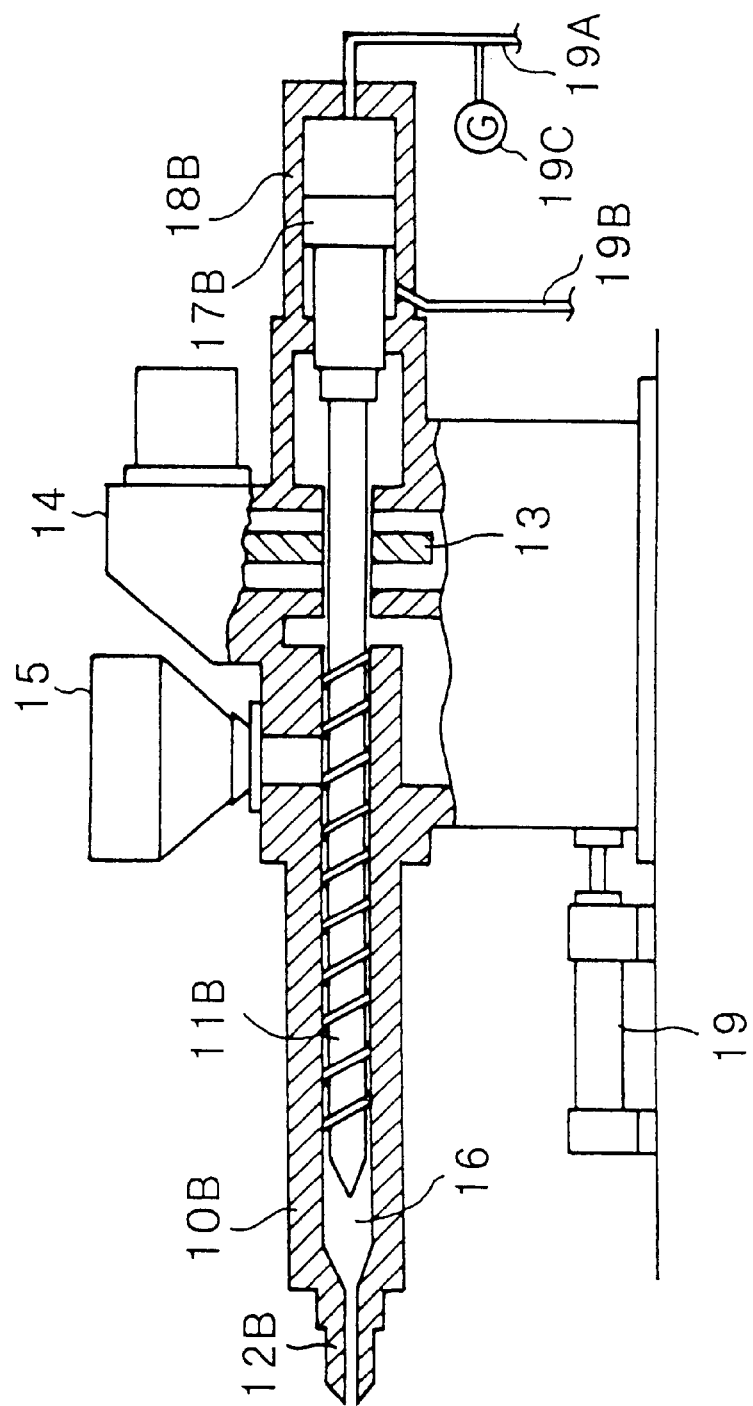
FIGS. 8 and 9 are schematic cross-sectional views showing structures of the injection cylinders 10B and 10A, respectively.
Figure 9:
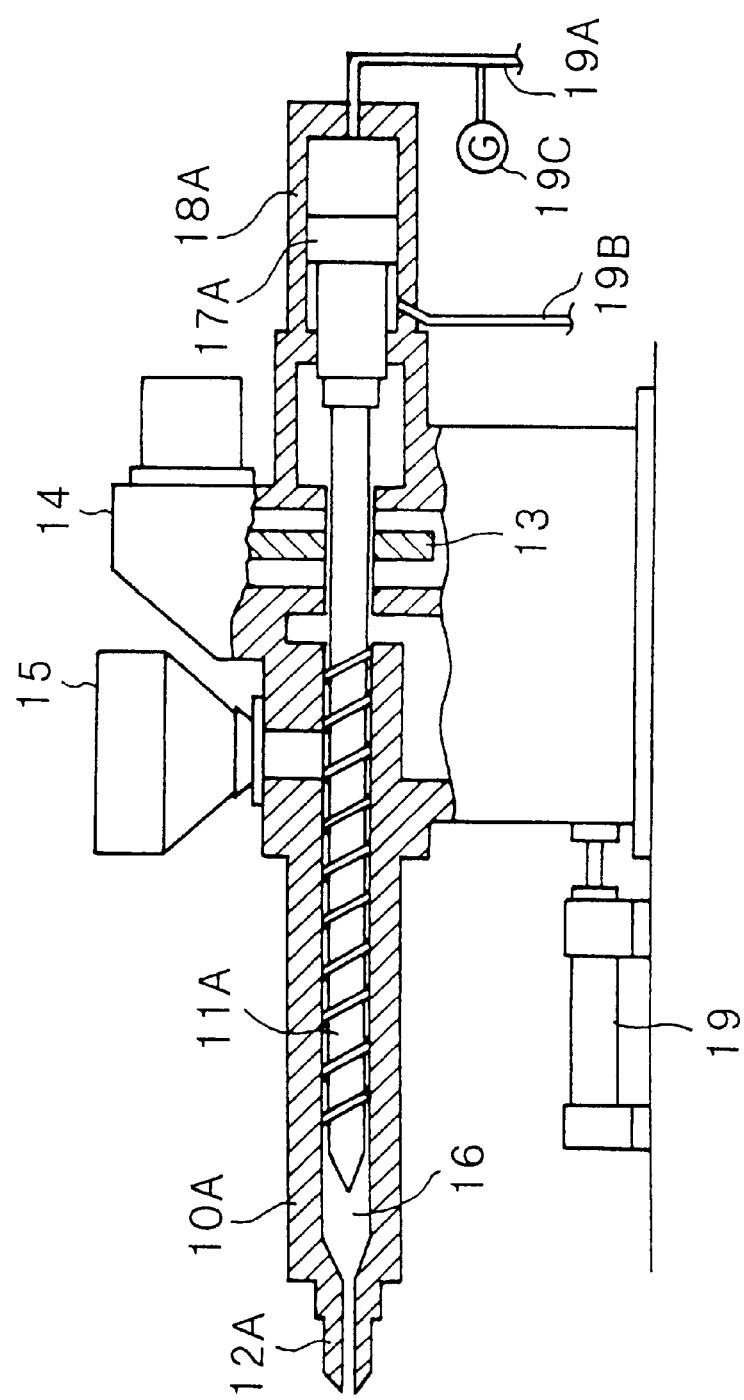

Each of screws 11A and 11B provided in the first and second injection cylinders 10A and 10B are in-line screw type screws which plasticize and melt a resin and also have the function of a plunger. The second injection cylinder 10B will be explained as an example with reference to FIG. 8 below, while the first injection cylinder 10A can have the same structure as shown in FIG. 9. The screw 11B is rotated with a hydraulic motor 14 through a reduction gear 13. The second resin fed to the screw 11B from a hopper 15 is heated, plasticized, melted and metered with the heating injection cylinder 10B and the screw 11B and reserved in a space 16 formed between the heating injection cylinder 10B and the top portion of the screw 11B. The screw 11B has an injection ram 17B attached to the backward end thereof, and the injection ram 17B is pressurized with an injection hydraulic cylinder 18B. The injection ram 17B is pressurized with the injection hydraulic cylinder 18B to push the screw 11B forward, and a pressure is exerted on the second molten resin. As a result, the second molten resin reserved in the space 16 is injected into the cavity 25 through the back flow control valve 30B, the second resin-flow-passage 23B and the gate portion 24. In FIG. 8, reference numeral 19 indicates a cylinder for moving an injection apparatus forward and backward, reference numerals 19A and 19B indicate hydraulic tubes, and reference numeral 19C indicates a pressure gage.

The method of injection molding a multi-layered article according to the first aspect of the present invention using the injection molding apparatus in Example 1 will be explained with reference to FIGS. 2 to 5. The injection molding method here is included in an alternate-injection method. FIG. 14 shows changes of an injection pressure, etc., with the lapse of time in the method of injection molding a multi-layered article in Example 1.

Step-100

Figure 3:
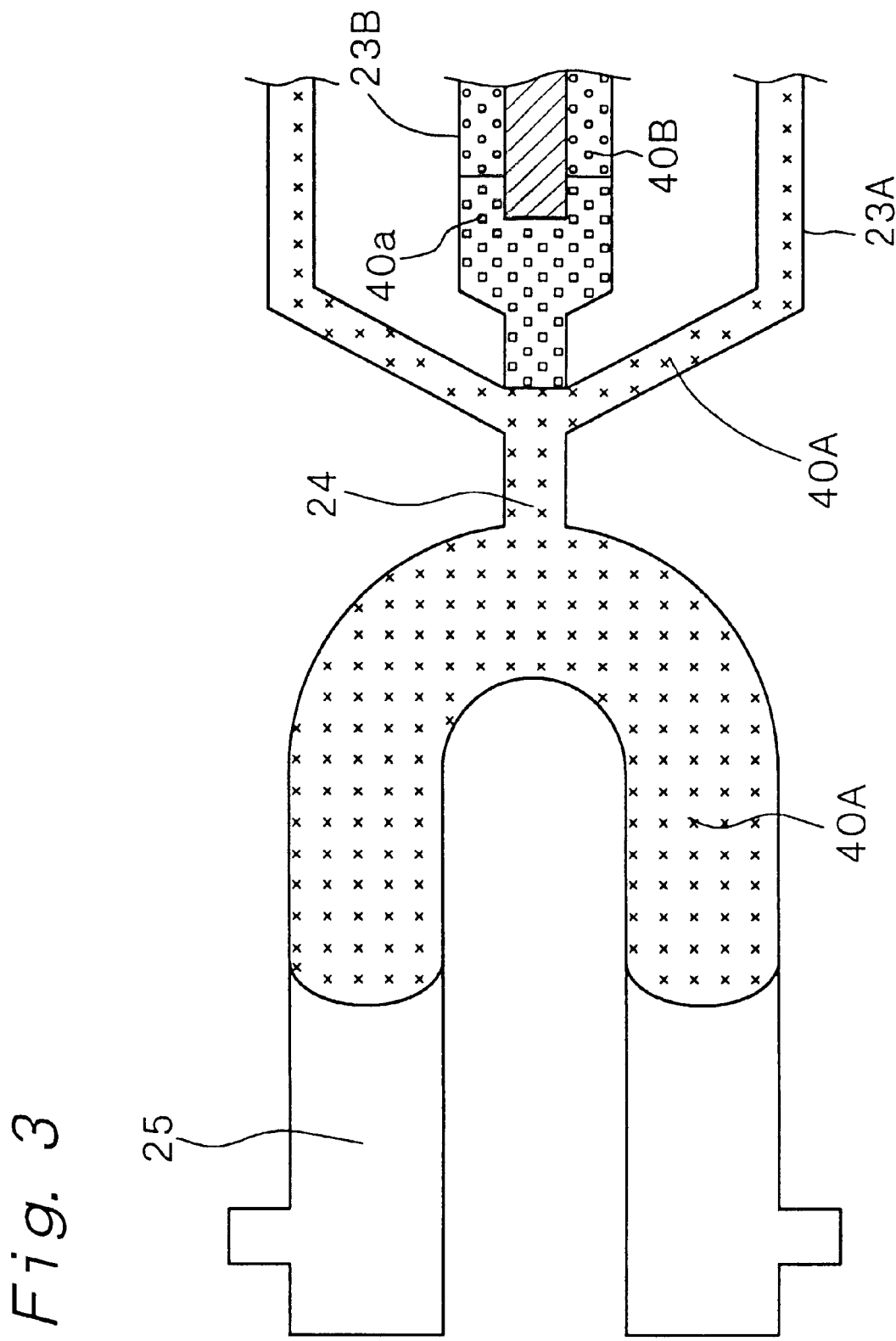
FIG. 3 schematically shows a cavity, etc., for explaining a method of injection molding a multi-layered article by virtue of the injection molding apparatus used in Example 1.

For forming a multi-layered article (a parison in Example 1), in a state where first and second molten resins 40A and 40B are metered as shown in FIG. 2, the air pressure cylinder 27 is actuated to move the gate cut pin 26 backward, whereby the gate cut pin 26 is withdrawn from the gate portion 24 and positioned in a backward end to open the gate portion 24. Part of the first molten resin 40A prepared in the first injection cylinder 10A is injected into the cavity 25 through the first resin-flow-passage 23A. That is, a pressure is applied to the injection ram 17A with the injection hydraulic cylinder 18A to push the screw 11A forward, whereby part of the first molten resin 40A prepared in the first injection cylinder 10A is injected into the cavity 25 through the first resin-flow-passage 23A and the gate portion 24. This state is schematically shown in FIG. 3, in which reference numeral 40a indicates first resin 40A which was injected during a previous molding cycle and remained in the second resin-flow-passage 23B (shown by blank squares in FIG. 3).

For example, so long as the molten resin filling ratio in the cavity 25 does not exceed, e.g. 70% of the volume of the cavity 25, and when first molten resin 40A is injected into the cavity 25, a pressure heading for the second injection cylinder 10B, caused by the injection of the first molten resin 40A, is hardly exerted on second molten resin 40B in the second resin-flow-passage 23B. In no case, therefore, does the second molten resin 40B in the second resin-flow-passage 23B flow back toward the second injection cylinder 10B.

Before injecting the first molten resin 40A into the cavity 25 through the first resin-flow-passage 23A for forming the outermost layer of a multi-layered article, i.e., before the above [Step-100], (specifically, in a previous molding cycle), a constant amount of molten resin other than a molten resin for a layer which is not the outermost layer of the multi-layered article (first molten resin 40A in Example 1) has already flowed into and been present in the second resin-flow-passage 23B upstream of the junction portion.

Step-110

Figure 4:
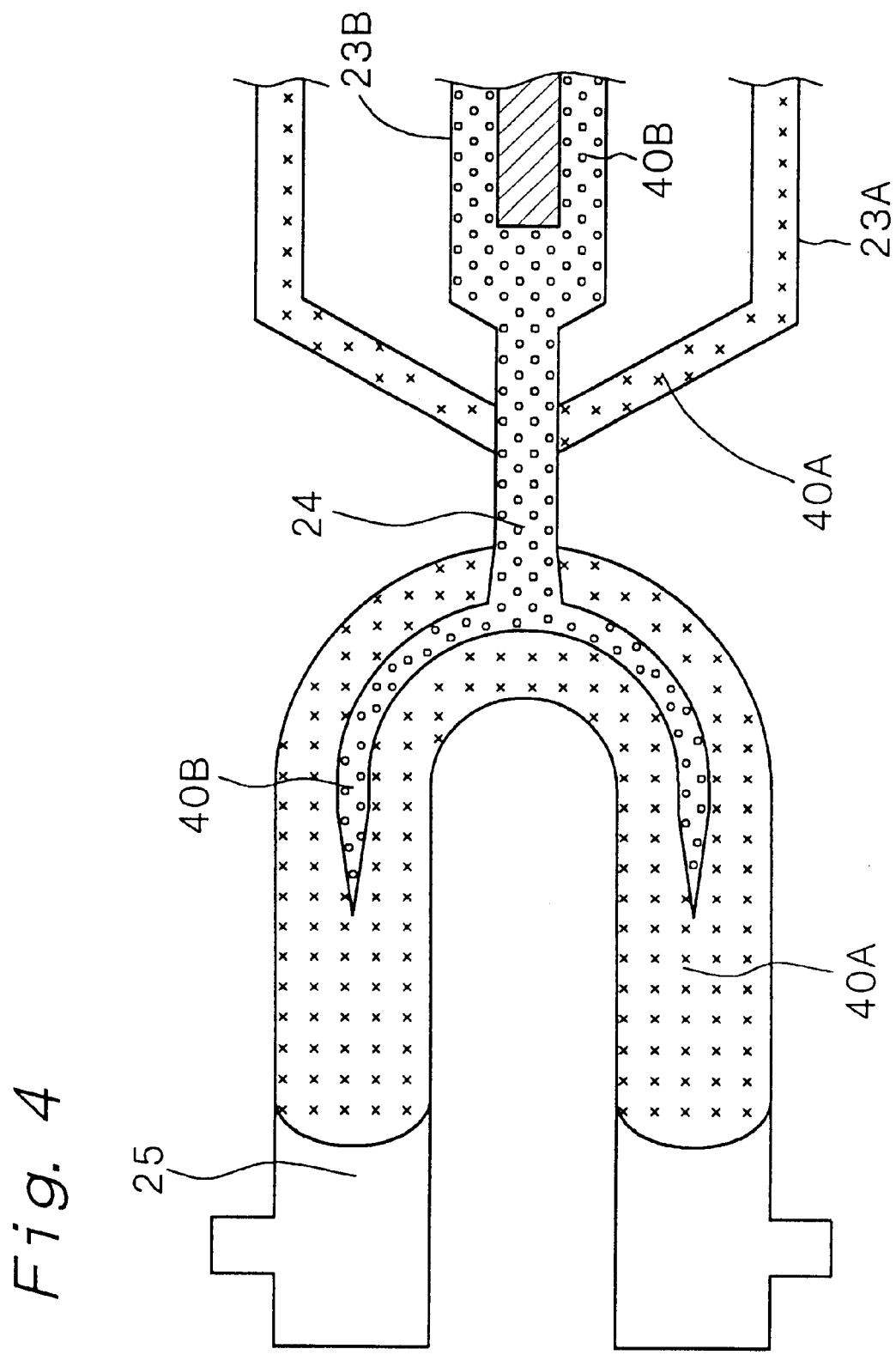
FIG. 4, subsequent to FIG. 3, schematically shows a cavity, etc., for explaining the method of injection molding a multi-layered article by virtue of the injection molding apparatus used in Example 1.

Then, the injection of the first molten resin 40A is discontinued. That is, the application of a pressure to the injection ram 17A with the injection hydraulic cylinder 18A in the first injection cylinder 10A is discontinued. Then, second molten resin 40B prepared in the second injection cylinder 10B is injected into the cavity 25 through the second resin-flow-passage 23B. That is, in the second injection cylinder 11B, a pressure is applied to the injection ram 17B with the injection hydraulic cylinder 18B to push the screw 11B forward. The second molten resin 40B prepared in the second injection cylinder 10B is injected into the cavity 25 through the second resin-flow-passage 23B and the gate portion 24. FIG. 4 schematically shows a state where the second molten resin 40B is being injected. Although depending upon injection conditions, the second molten resin 40B injected into the cavity 25 moves forward through a central portion of the first molten resin 40A filled in part of the cavity 25. The first molten resin 40a which has flowed into to be left in the second resin-flow-passage 23B in a previous molding cycle is injected into the cavity 25 together with the second molten resin 40B. However, FIG. 4 omits showing of the first molten resin 40a.

An injection molding apparatus having three injection cylinders may be used to inject a third resin melted in a third injection cylinder into the cavity through a third resin-flow-passage after the Step-110. In this case, the third resin may be the same as, or different from, the first resin.

Step-120

Figure 5:
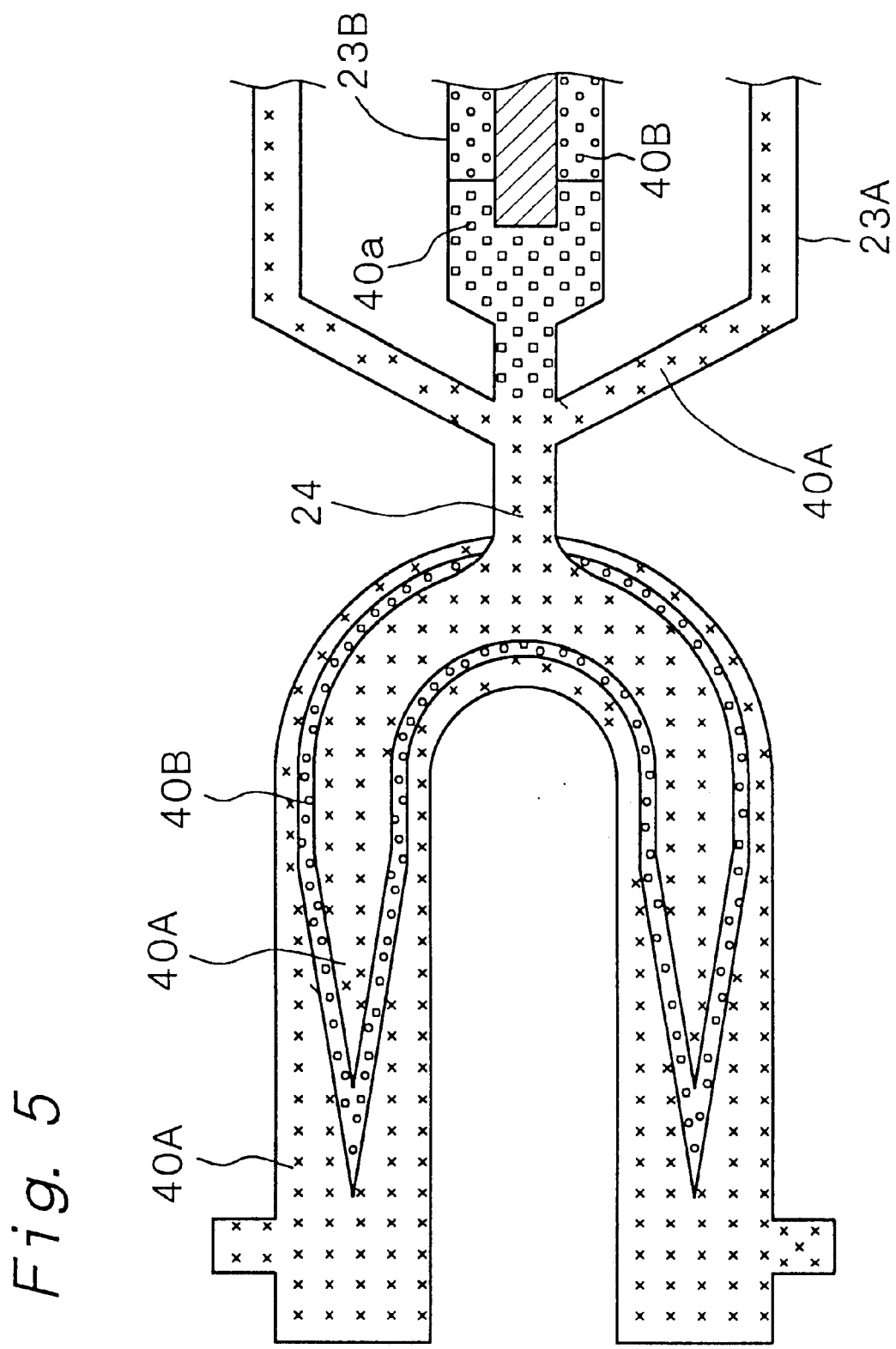
FIG. 5, subsequent to FIG. 4, schematically shows a cavity, etc., for explaining the method of injection molding a multi-layered article by virtue of the injection molding apparatus used in Example 1.

When the injection of the second molten resin 40B is completed, the application of a pressure to the injection ram 17B with the injection hydraulic cylinder 18B in the second injection cylinder 10B is terminated. And, the balance of the first molten resin 40A prepared in the first injection cylinder 10A is injected into the cavity 25 through the first resin-flow-passage 23A and the gate portion 24. That is, in the first injection cylinder 10A, a pressure is applied to the injection ram 17A with the injection hydraulic cylinder 18A to push the screw 11A forward, whereby the balance of the first molten resin 40A prepared in the first injection cylinder 10A is injected into the cavity 25 through the first resin-flow-passage 23A and the gate portion 24. FIG. 5 schematically shows a state where the injection of the balance of the first molten resin 40A is completed. The amount of the balance of the first molten resin 40A is to be a total of an amount of first molten resin 40A sufficient for finally filling the entire cavity 25 and an amount of first molten resin 40A which flows into the second resin-flow-passage 23B. Although depending upon injection conditions, the first molten resin 40A injected into the cavity 25 moves forward through a central portion of the second molten resin 40B filled in part of the cavity 25.

At this moment, a pressure which heads for the second injection cylinder 10B is exerted on the second molten resin 40B in the second resin-flow-passage 23B with the first molten resin 40A. Therefore, the second molten resin 40B in the second resin-flow-passage 23B flows back toward the second injection cylinder 10B. As a result, part of the first molten resin 40A in the first resin-flow-passage 23A flows into the second resin-flow-passage 23B. As explained already, the ball 34 is moved from the diameter-enlarged portion 33 of the cylindrical tube portion 31 to the upstream end portion of the hollow portion 32 by the back flow of the second molten resin 40B. The volume of the second molten resin 40B which flows back is constant. The amount of the first molten resin 40A which flows into the second resin-flow-passage 23B from the first resin-flow-passage 23A is therefore a constant amount. That part of the first molten resin which flows into the second resin-flow-passage 23B is indicated by reference numeral 40a and shown by blank squares. In this case, the first molten resin 40a which flows into the second resin-flow-passage 23B is mixed with, or is hardly mixed with, the second molten resin 40B, which differs depending upon injection conditions. Further, under some injection conditions, in this step there occurs no phenomenon that part of the first molten resin 40A in the first resin-flow-passage 23A flows into the second resin-flow-passage 23B, but during the subsequent application of a dwell pressure, there occurs a phenomenon that part of the first molten resin 40A in the first resin-flow-passage 23A flows into the second resin-flow-passage 23B. Further, the flowing of part of the first molten resin 40A in the first resin-flow-passage 23A into the second resin-flow-passage 23B comes to an end during the injection of the first molten resin 40A or during the application of a dwell pressure, which differs depending upon injection conditions.

Step-130

After completion of the injection of the first molten resin 40A, a dwell pressure is applied with the first injection cylinder 10A. Then, the gate cut pin 26 is moved forward to close the gate portion 24 therewith. Then, the resin in the cavity 25 is cooled, the mold is then opened, and a parison as a multi-layered article is taken out. Although differing depending upon injection conditions, a main portion of the multi-layered article (a main portion of the side wall of the parison) has a five-layer structure of the first resin 40A/the second resin 40B/the first resin 40A/the second resin 40B/the first resin 40A. A portion other than the main portion of the multi-layered article is composed of the first resin 40A.

The volume of the first molten resin 40A which flows into the second resin-flow-passage 23B is preferably 5 to 50% based on the volume of the cavity 25. The first molten resin 40A which has flowed into the second resin-flow-passage 23B is injected into the cavity 25 together with the second molten resin 40B when the second molten resin 40B is injected. So long as the volume of the first molten resin 40A which flows into the second resin-flow-passage 23B does not exceed 50% of the volume of the cavity 25, the first molten resin 40A which is injected into the cavity together with the second molten resin 40B causes no detrimental effect on properties of the multi-layered article. Further, so long as the volume of the first molten resin 40A which flows into the second resin-flow-passage 23B does not exceed 25% of the volume of the cavity 25, the occurrence of a turbulence in the resin layers composing the layers of the multi-layered article can be reliably prevented. When the volume of the first molten resin 40A which flows into the second resin-flow-passage 23B exceeds 25%, and does not exceed 50%, of the volume of the cavity 25, a turbulence may occur in the resin layers composing the layers of the multilayered article to some extent in some cases, while it is not the turbulence which causes a problem in practical use. When the volume of the first molten resin 40A which flows into the second resin-flow-passage 23B exceeds 50% of the volume of the cavity 25, there are some cases in which a turbulence may occur in the resin layers composing the layers of the multi-layered article and causes a problem in practical use.

On the other hand, when the volume of the first molten resin 40A which flows into the second resin-flow-passage 23B is less than 5% based on the volume of the cavity 25, for example, the first molten resin 40a which has flowed and remained in the second resin-flow-passage 23B during the previous molding cycle and further, the second molten resin 40B in the second resin-flow-passage 23B are taken into the first molten resin 40A being injected into the cavity 25 when the first molten resin 40A is injected into the cavity 25 in the [Step-100], and the second molten resin 40B also flows into the cavity 25. As a result, the first molten resin 40A and the second molten resin 40B are mixed in the cavity, and in some cases there is a problem that the second resin 40B comes to exist on the outermost layer of a multi-layered article.

As explained already, a phenomenon that the first molten resin in the first resin-flow-passage flows into the second resin-flow-passage does not take place constantly, while it takes place when the molten resin filling ratio in the cavity 25 exceeds, e.g., 70%. In [Step-100], so long as the molten resin filling ratio in the cavity 25 does not exceed, e.g., 70% of the volume of the cavity 25, when the first molten resin 40A is injected into the cavity 25, a pressure heading for the second injection cylinder 10B, caused by the injection of the first molten resin 40A, is hardly exerted on the second molten resin 40B in the second resin-flow-passage 23B, and in no case does the first molten resin 40A flows into the second resin-flow-passage 23B. In [Step-110], similarly, so long as the second molten resin 40B is injected into the cavity 25 such that the molten resin filling ratio in the cavity 25 does not exceed, e.g., 70%, a pressure heading for the first injection cylinder 10A, caused by the injection of the second molten resin 40B, is hardly exerted on the first molten resin 40A in the first resin-flow-passage 23A when the second molten resin 40B is injected into the cavity 25. Therefore, the first molten resin 40A in the first resin-flow-passage 23A does not flow back toward the first injection cylinder 10A. It is not necessary to provide a valve for preventing back flow into the nozzle portion 12A of the first injection cylinder 10A or between the nozzle portion 12A and the mold 20, while such a valve may be provided in the nozzle portion 12A of the first injection cylinder 10A or between the nozzle portion 12A and the mold 20. The above valve may have the same structure as that of the back flow control valve 30B, or it may be a ball check valve which prevents back flow of a molten resin.

Figure 10A:
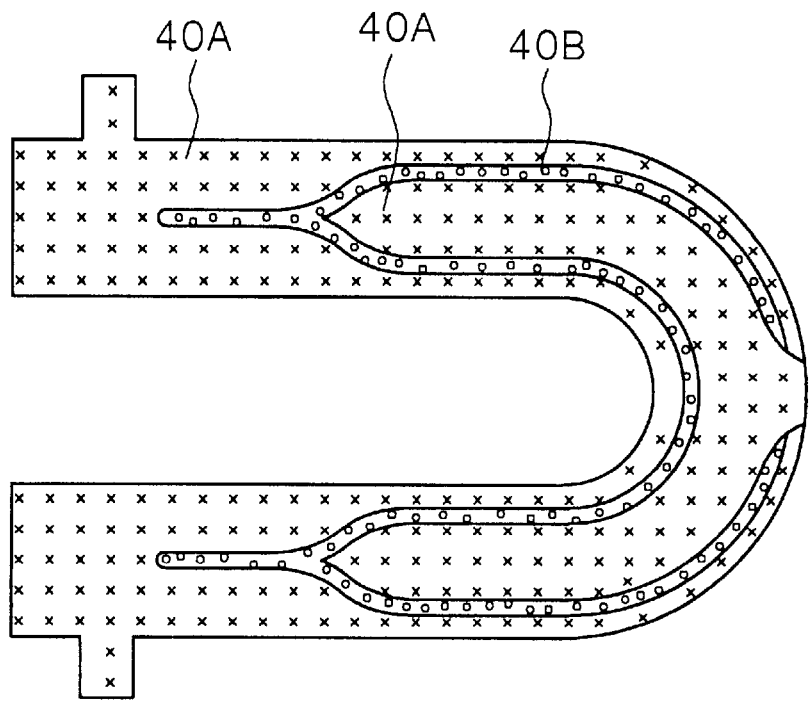
FIGS. 10A, 10B, 11A and 11B are schematic cross-sectional views of parisons.
Figure 10B:
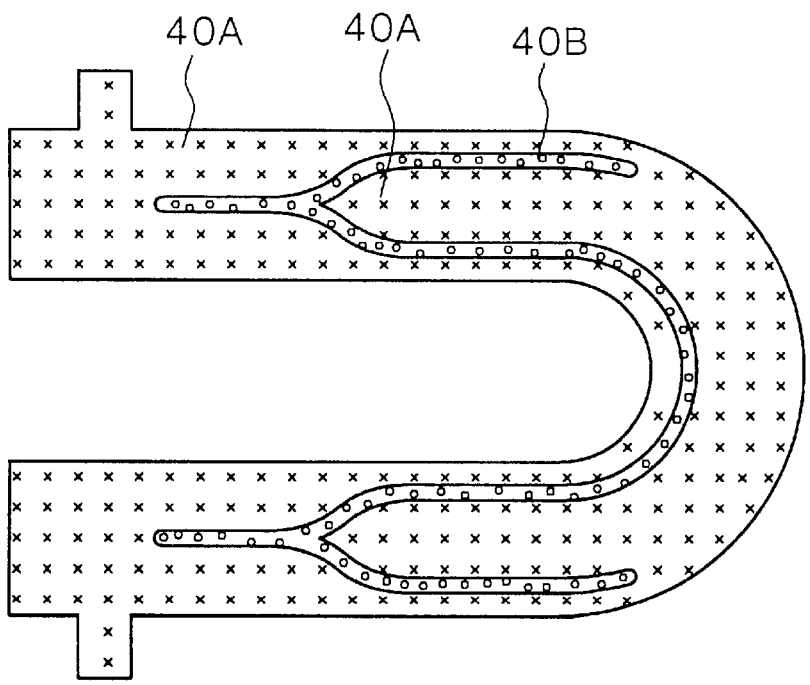

Under some injection conditions, the first molten resin 40A injected into the cavity 25 in [Step 120] moves forward through a central portion of the second molten resin 40B already filled in part of the cavity 25, while it does not reach the top end portion of the resin layer formed of the second molten resin 40B. As a cross-section of a parison is schematically shown in FIG. 10A, therefore, part of a main portion of the multi-layered article (a main portion of the side wall of the parison) can be structured to have a five-layer structure of the first resin 40A/the second resin 40B/the first resin 40A/the second resin 40B/the first resin 40A, and another part of the main portion of the multi-layered article can be structured to have a three layer structure of the first resin 40A/the second resin 40B/the first resin 40A. Otherwise, as shown in FIG. 10B, a parison can be formed so as to have a side wall structure of three layers/five layers/three layers under some injection conditions.

Figure 15:
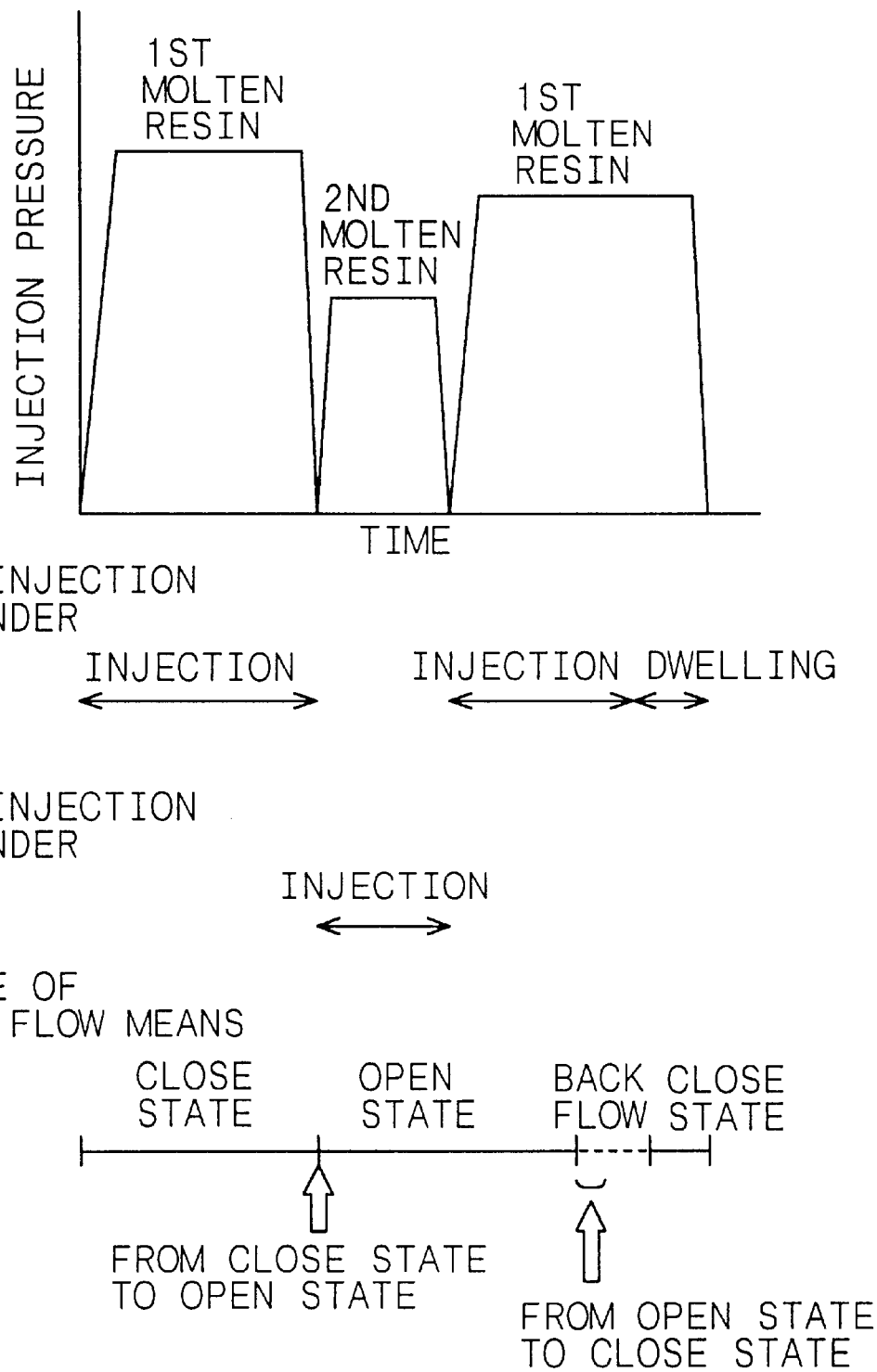
Figure 16:
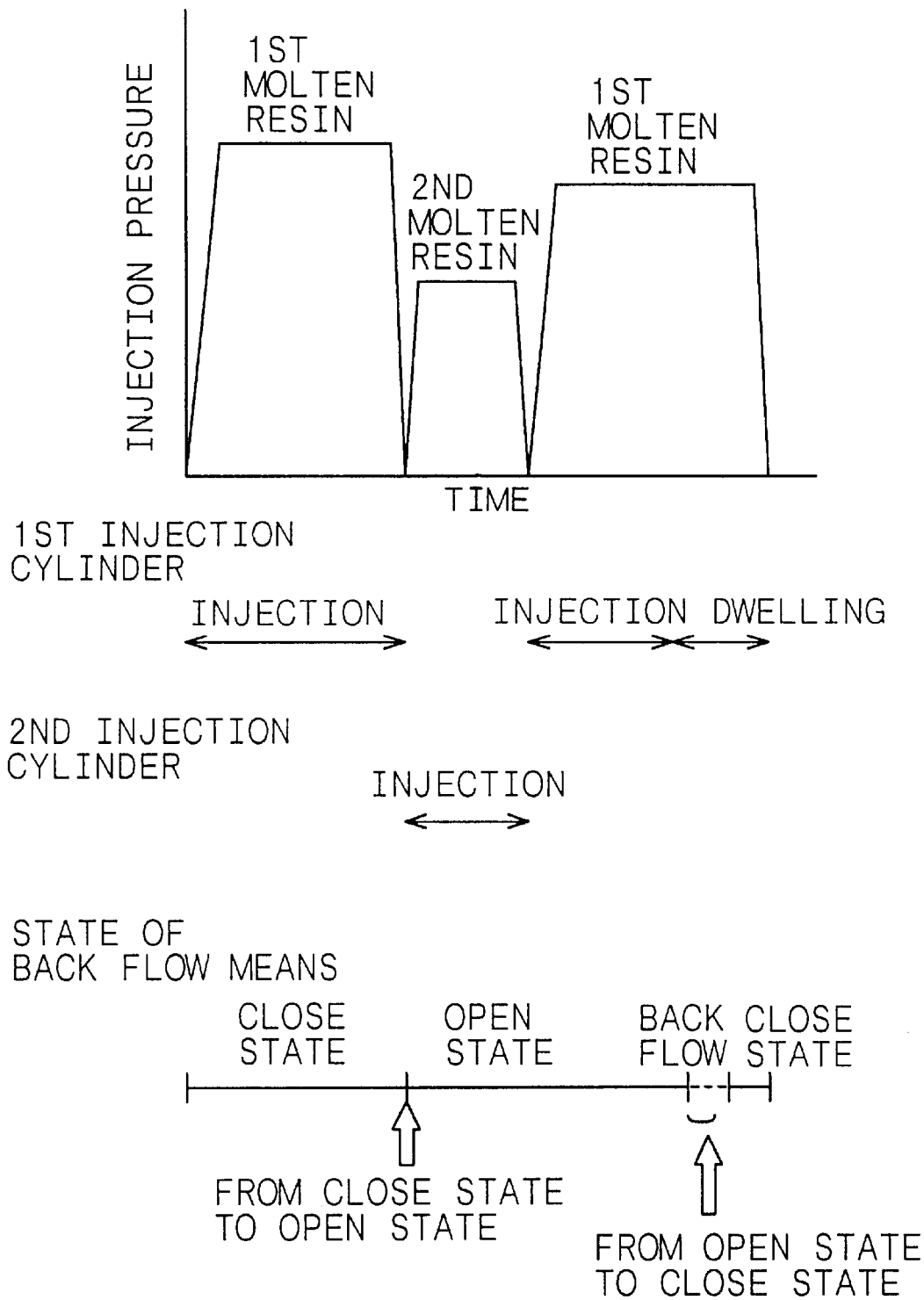

As FIGS. 14, 15 and 16 show changes of an injection pressure, etc., with the lapse of time in the alternate-injection molding method, it depends upon injection molding conditions whether the phenomenon of flowing of part of the first molten resin 40A in the first resin-flow-passage 23A into the second resin-flow passage 23B takes place during the injection of the first molten resin 40A (see FIGS. 14 and 15) or after the injection is completed (see FIG. 16). When first molten resin 40A in the first resin-flow-passage 23A flows into the second resin-flow-passage 23B on the basis of operation of the back flow device after completion of injection of the first molten resin 40A, specifically, a dwell pressure is applied by virtue of the first injection cylinder 10A and the back flow device is operated to allow the first molten resin 40A in the first resin-flow-passage 23A to flow into the second resin-flow-passage 23B after completion of injection of the first molten resin 40A (see FIG. 16). When the first molten resin 40A in the first resin-flow-passage 23A begins to flow into the second resin-flow-passage 23B on the basis of operation of the back flow structure during the injection of the first molten resin 40A, the flowing of first molten resin 40A into the second resin-flow-passage 23B may be completed during the injection of the first molten resin 40A (see FIG. 14), concurrently with the completion of injection of the first molten resin 40A or during the application of a dwell pressure after completion of injection of the first molten resin 40A (see FIG. 16).

Figure 11A:
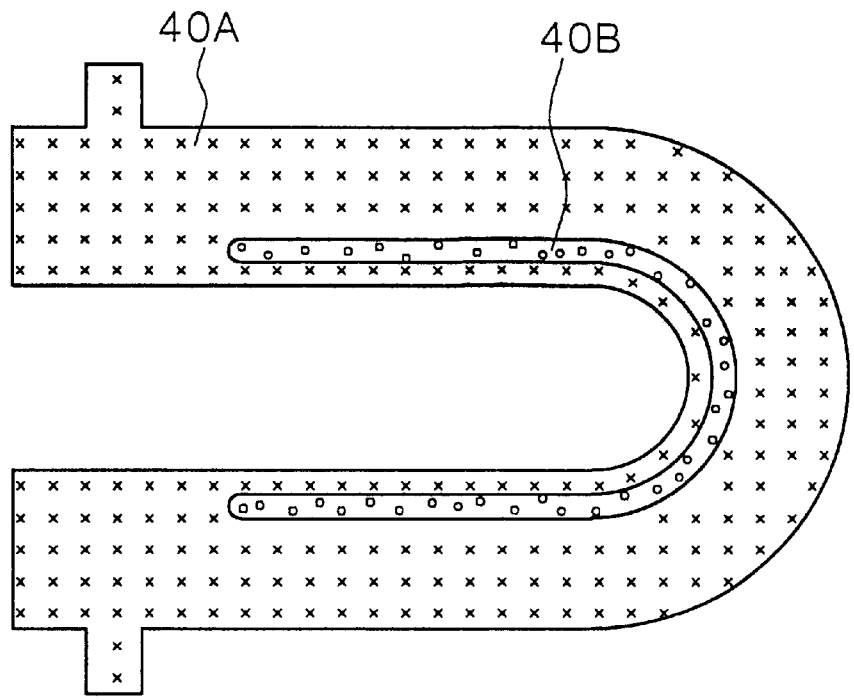
Figure 11B:
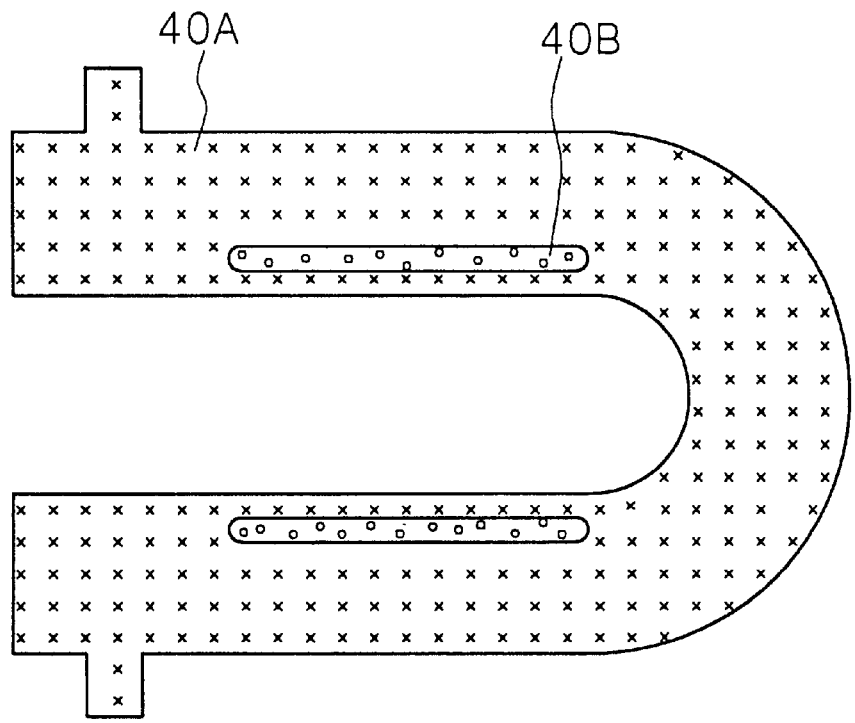
Figure 18:
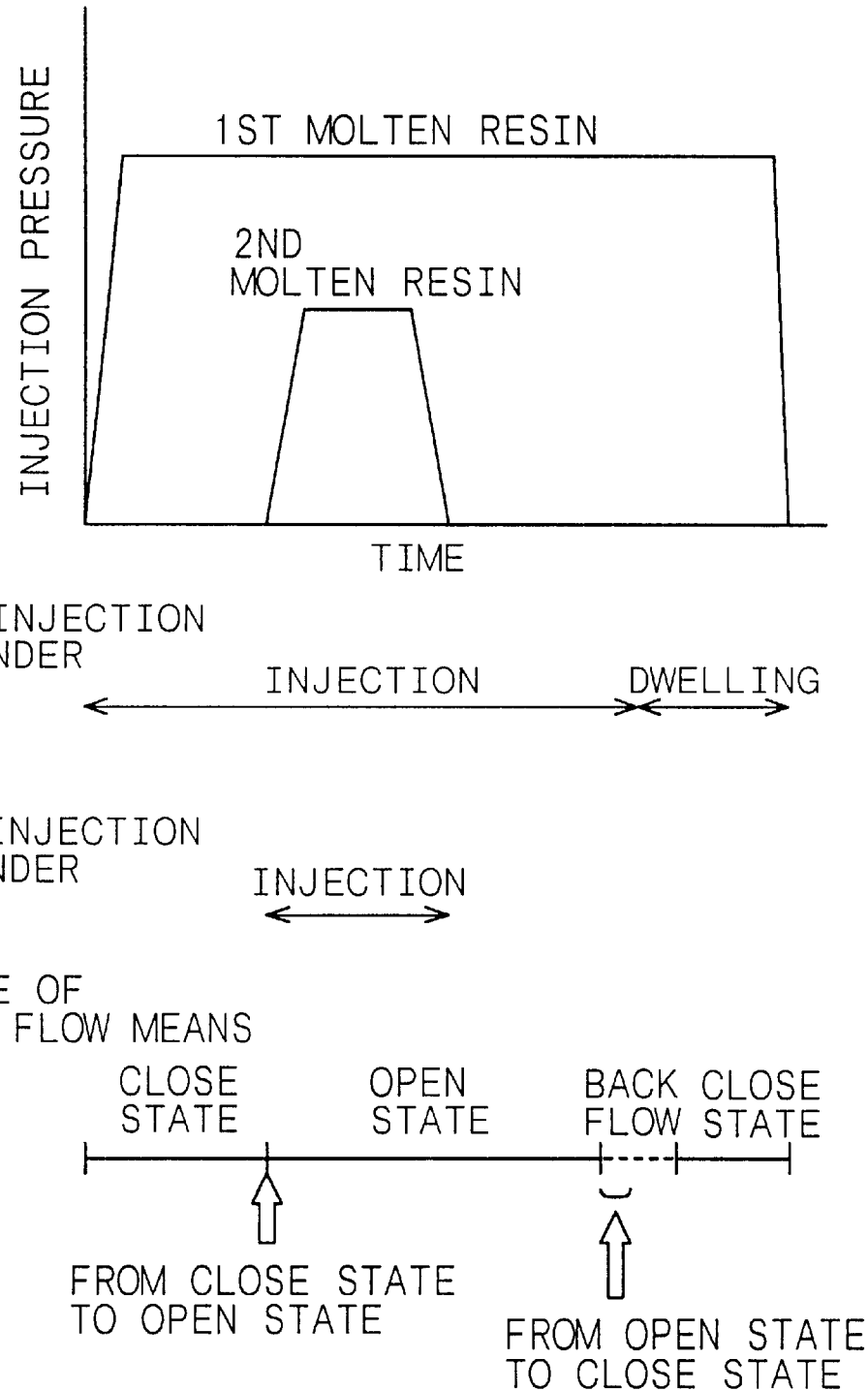
Figure 19:
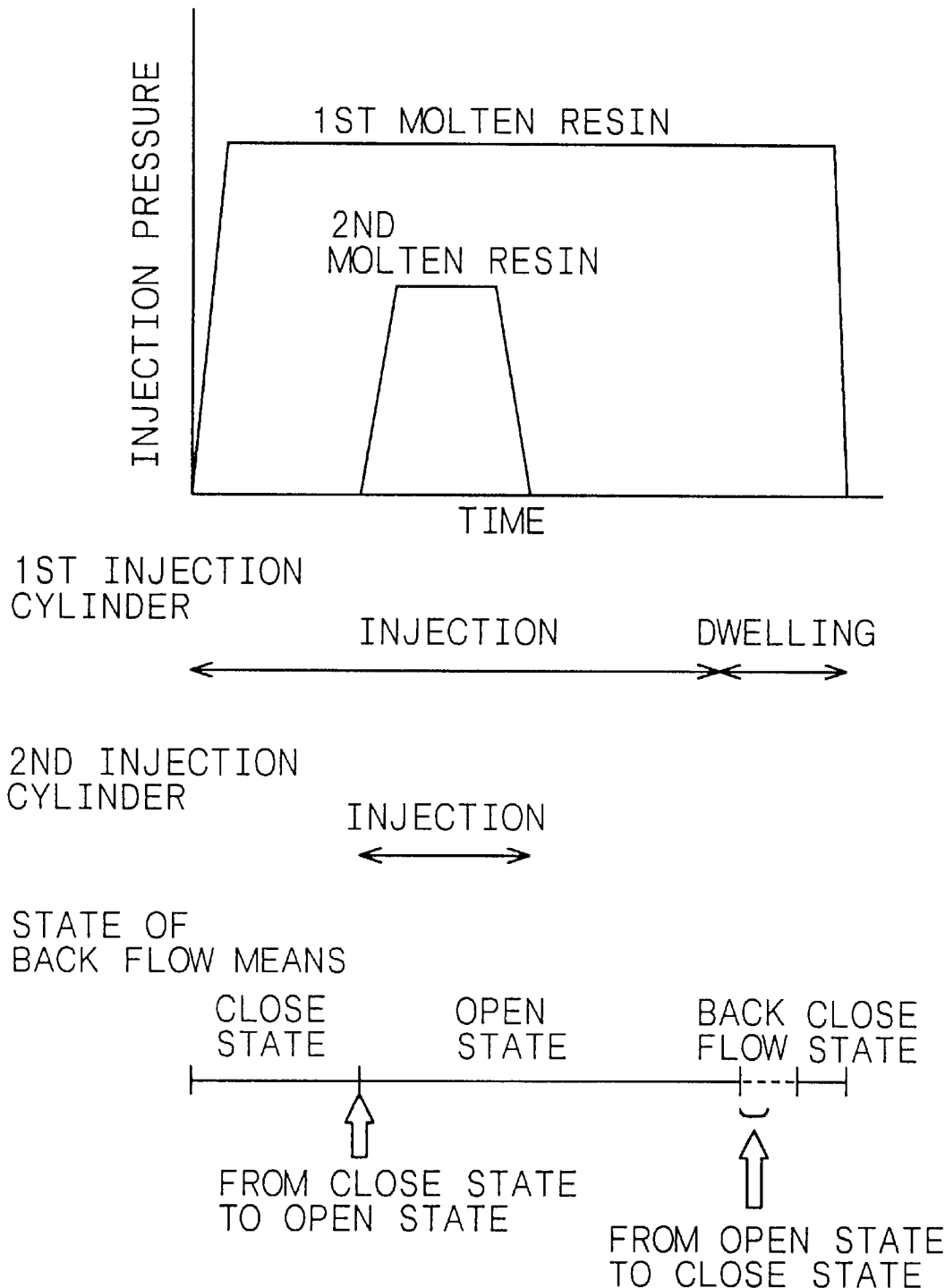

Further, if an injection is carried out on the basis of the simultaneous-injection molding method which is the method of injection molding a multi-layered article according to the second aspect of the present invention, i.e., if a certain amount of the second molten resin 40B is injected into the cavity 25 while the injection of the first molten resin 40A into the cavity 25 is continued in [Step-110], there is obtained a multi-layered article (parison) having a main portion (main portion of a side wall of the parison) having a three-layer structure of the first resin/the second resin/the first resin, as FIG. 11A schematically shows the cross-sectional view of the parison. In some cases, there can be also obtained a parison having a main portion of which part has a three-layer structure of the first resin/the second resin/the first resin, as FIG. 11B schematically shows the cross-sectional view of the parison. As FIGS. 17, 18 and 19 show changes of an injection pressure, etc., with the lapse of time, after completion of injection of the second molten resin 40B, and during, or after completion of, the injection of the first molten resin 40A, the first molten resin 40A in the first resin-flow-passage 23A flows into the second resin-flow-passage 23B on the basis of operation of the back flow device. It depends upon injection molding conditions whether the phenomenon of flowing of part of the first molten resin 40A in the first resin-flow passage 23A into the second resin-flow-passage 23B takes place during the injection of the first molten resin 40A (see FIGS. 17 and 18) or after the injection is completed (see FIG. 19). When the first molten resin 40A in the first resin-flow-passage 23A flows into the second resin-flow-passage 23B on the basis of operation of the back flow device after completion of injection of the first molten resin 40A, specifically, a dwell pressure is applied by virtue of the first injection cylinder 10A and the back flow device is operated to allow the first molten resin 40A in the first resin-flow-passage 23A to flow into the second resin-flow-passage 23B after completion of injection of the first molten resin 40A (see FIG. 19). When the first molten resin 40A in the first resin-flow-passage 23A begins to flow into the second resin-flow-passage 23B on the basis of operation of the back flow device during the injection of the first molten resin 40A the flowing of the first molten resin 40A into the second resin-flow-passage 23B may be completed during the injection of the first molten resin 40A (see FIG. 17), concurrently with completion of injection of the first molten resin 40A or during the application of a dwell pressure after completion of injection of the first molten resin 40A (see FIG. 18).

Figure 20:
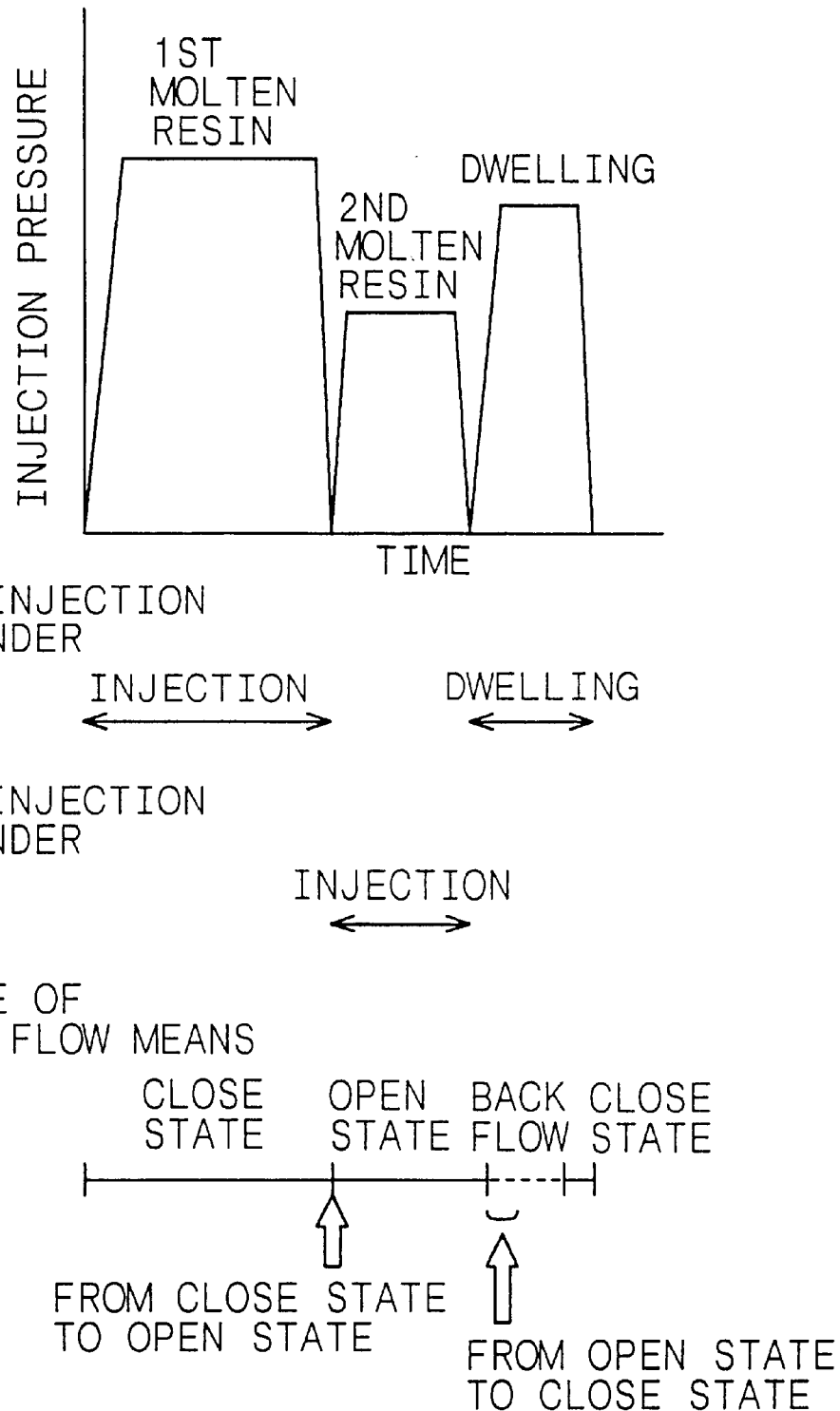
FIG. 20 is a graph showing changes of an injection pressure, etc., with the lapse of time in the method of injection molding a multi-layered article according to the third aspect of the present invention.
Figure 21:
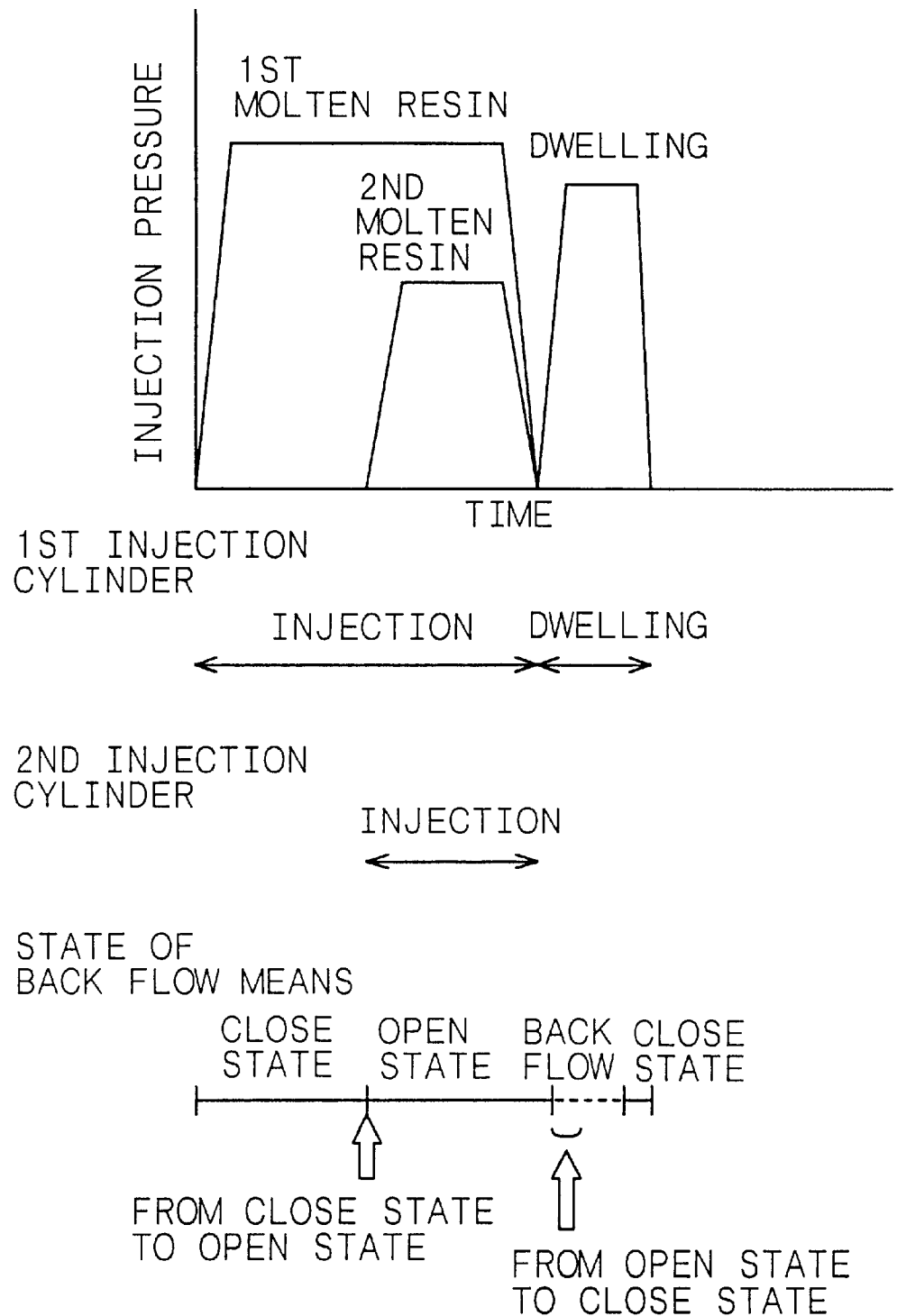
FIG. 21 is a graph showing changes of an injection pressure, etc., with the lapse of time in the method of injection molding a multi-layered article according to the fourth aspect of the present invention.

Further, the [Step-120] may be omitted in some cases. In this case, in an alternate-injection molding method which is the method of injection molding a multilayered article according to the third aspect of the present invention, second molten resin 40B is injected into the cavity 25 so as to completely fill the cavity 25 with the second molten resin 40B in [Step-110]. In a simultaneous-injection method which is the method of injection molding a multi-layered article according to the fourth aspect of the present invention, second molten resin 40B is injected into the cavity 25 while the injection of first molten resin 40A into the cavity 25 is continued, to completely fill the cavity 25 with the first molten resin 40A and the second molten resin 40B in [Step-110]. And, in these cases, a dwell pressure is applied with the first injection cylinder 10A in [Step-130]. By the dwell pressure by the first injection cylinder 10A, a pressure heading for the second injection cylinder 10B is exerted on the second molten resin 40B in the second resin-flow-passage 23B with the first molten resin 40A. As a result, the back flow device is operated, the second molten resin 40B in the second resin-flow-passage 23B flows back toward the second injection cylinder 10B, and part of the first molten resin 40A in the first resin-flow-passage 23A flows into the second resin-flow-passage 23B (see FIGS. 20 and 21).

Figure 12A:
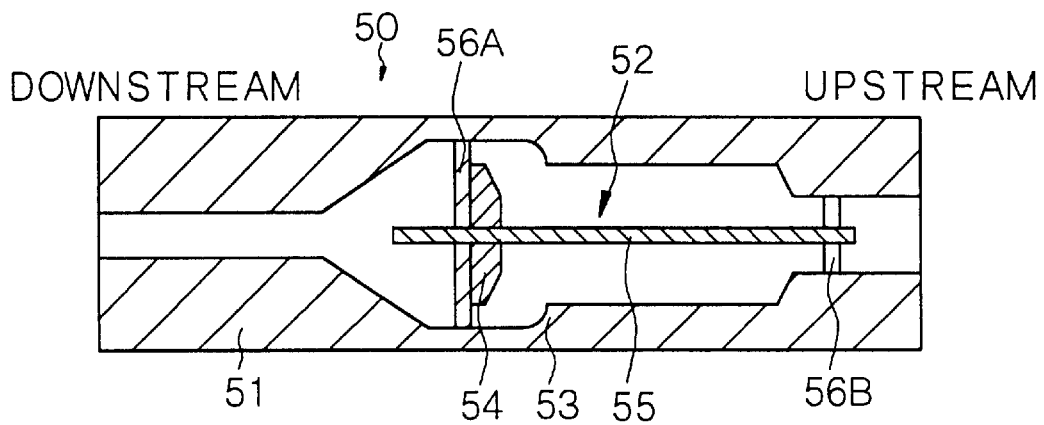
FIGS. 12A, 12B and 12C are schematic end views of a sliding valve-type back flow control valve.
Figure 12B:
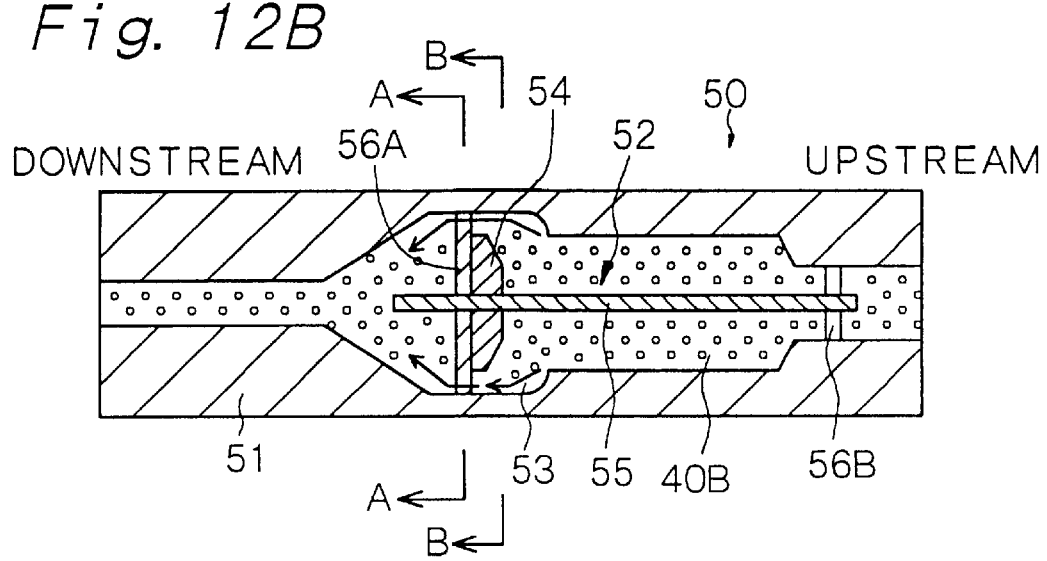
Figure 12C:
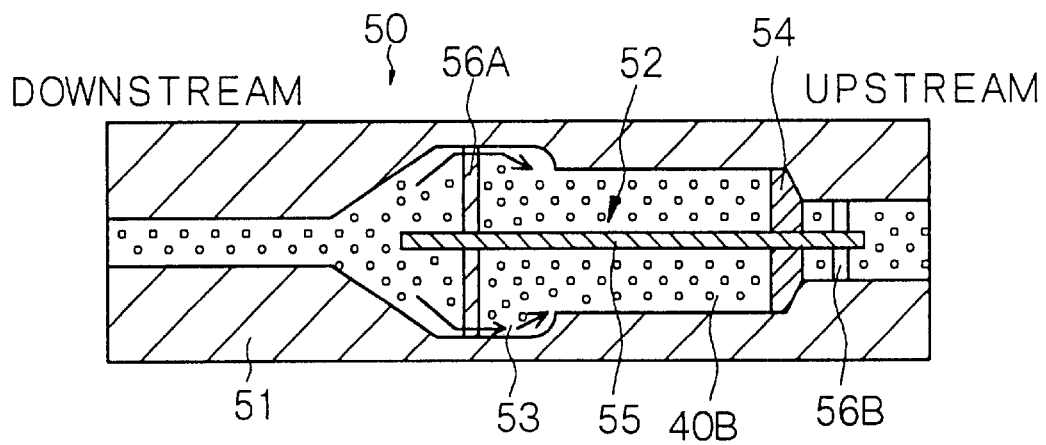

As a back flow control valve, the ball-type back flow control valve shown in FIGS. 6A, 6B and 6C may be replaced with a sliding valve-type back flow control valve 50 shown in FIGS. 12A, 12B and 12C. The sliding valve-type back flow control valve 50 has a structure in which a constant amount of the second molten resin 40B can flow back. Specifically, the back flow control valve 50 comprises a cylindrical tube portion 51 having a hollow portion 52, a valve member (sliding valve) 54 housed in the hollow portion 52 and a bar 55, as FIG. 12A shows its schematic end view. The bar 55 is provided in the central portion of the cylindrical tube portion 51 and along an axial line thereof, and attached to the cylindrical tube portion 51 with supports 56A and 56B. Second molten resin 40B can pass through the supports 56A and 56B freely. The central portion of the valve member 54 is slidably attached to the bar 55. That predetermined portion of the hollow portion 52 which is located from the downstream end portion of the hollow portion 52 (on the mold side) toward the upstream side of the hollow portion 52 has a larger cross sectional area than the valve member 54. The above predetermined portion of the hollow portion 52 will be called a diameter-enlarged portion 53. Another portion of the hollow portion 52 has a cross sectional area nearly equal to the cross sectional area of the valve member 54.

When the second molten resin 40B is injected toward the cavity 25 from the second injection cylinder 10B, the valve member 54 is pressed to the support 56A on the downstream end portion side of the hollow portion 52 with a pressure of the second molten resin 40B. When the second molten resin 40B is injected into the cavity through the second resin-flow-passage 23B, and after the completion of the injection, therefore, the inside of the second injection cylinder 10B and the cavity 25 are brought into a communicated state by virtue of the back flow control valve 50. The second molten resin 40B flows toward the cavity 25 through a space between the valve member 54 and the diameter-enlarged portion 53.

On the other hand, the second molten resin 40B flows back due to a pressure which the first molten resin 40A in the first resin-flow-passage 23A exerts on the second molten resin 40B in the second resin-flow-passage 23B. When the second molten resin 40B flows back through the back flow control valve 50, the valve member 54 is moved toward the upstream end portion of the hollow portion 52 in response to the pressure of the first molten resin 40A which flows into the second resin-flow-passage 23B and the valve member 54 is finally pressed to the upstream end portion of the hollow portion 52 (see FIG. 12C). There is no gap between the valve member 54 and the upstream end portion of the hollow portion 52. In a state shown in FIG. 12C, therefore, the second molten resin 40B does not flow back any further. In other words, while the valve member 54 is moving from the downstream end portion to the upstream end portion of the hollow portion 52 of the cylindrical tube portion 51, the second molten resin 40B flows back through the back flow control valve 50. Generally, the volume of the second molten resin 40B which flows back is approximately defined by a product of the cross sectional area of the portion of the hollow portion 52 where the valve member 54 moves and the movement distance of the valve member 54 and is a constant value. In other words, generally, the volume of the second molten resin 40B which flows back is nearly equal to a volume obtained by deducting the volume of the valve member 54 from the volume of the hollow portion 52, and is a constant amount. Therefore, the volume of the first molten resin 40A which flows into the second resin-flow-passage 23B can be defined by properly selecting and determining the cross sectional area of the portion of the hollow portion 52 where the valve member 54 moves and the movement distance of the valve member 54. In other words, a product of the cross sectional area of the portion of the hollow portion 52 where the valve member 54 moves and the movement distance of the valve member 54 is nearly equal to a volume of the first molten resin 40A which flows into the second resin-flow-passage 23B. In FIGS. 12B and 12C, directions in which the second molten resin 40B flows are indicated by arrows. The cross-sectional forms of the valve member 54 and the hollow portion 52, obtained by cutting them with a plane perpendicular to the flow directions of the second molten resin 40B, are preferably circular but shall not be limited thereto. The above cross-sectional forms may be rectangular or any other form.

The first molten resin 40A in the first resin-flow-passage 23A begins to flow into the second resin-flow-passage 23B, and the valve member 54 begins to move from the diameter-enlarged portion 53 of the cylindrical tube portion 51 to the upstream end portion of the hollow portion 52. When the predetermined amount of the first molten resin 40A in the first resin-flow-passage 23A flows into the second resin-flow-passage 23B, the valve member 54 reaches the boundary between the diameter-enlarged portion 53 and the another portion of the hollow portion 52. The inside of the second injection cylinder 10B and the cavity 25 are brought into a non-communicated state at a point of time when the valve member 54 comes into the another portion of the hollow portion 52, since the cross-sectional form of the another portion of the hollow portion 52 is nearly equal to the cross-sectional form of the valve member 54.

Figure 13A:
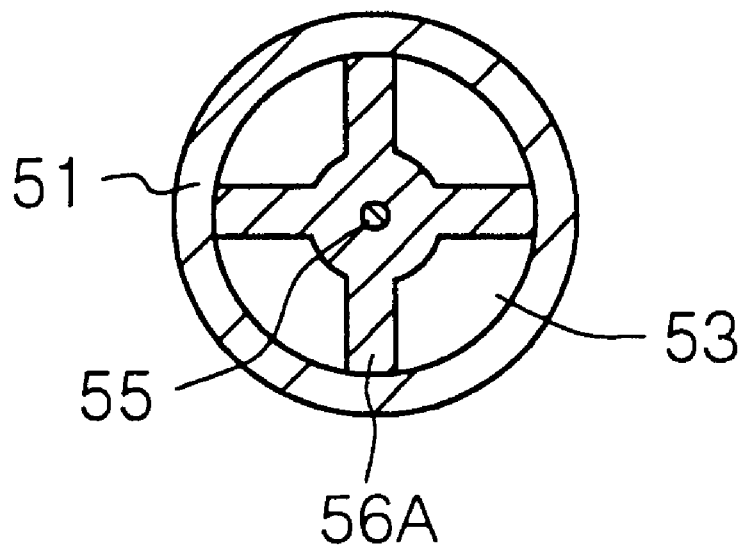
FIG. 13A is a schematic cross-sectional view of a cylindrical tube portion taken along a line A—A in FIG. 12B.
Figure 13B:
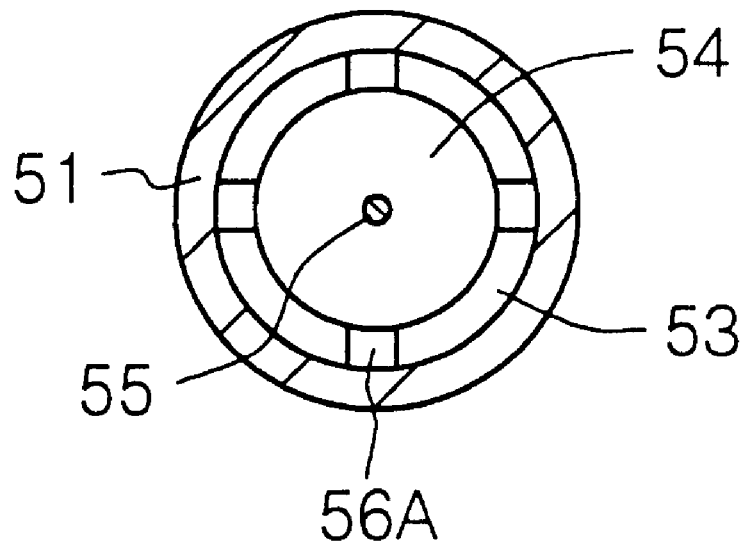
FIG. 13B is a schematic cross-sectional view of a cylindrical tube portion taken along a line B—B in FIG. 12B.

FIG. 13A shows a schematic cross-sectional view of the cylindrical tube portion 51 taken along a line A—A in FIG. 12B, and FIG. 13B shows a schematic cross-sectional view of the cylindrical tube portion 51 taken along a line B—B in FIG. 12B. The support 56A has a disk-shaped central portion, four arms extend from its circumference, and the top end of each arm reaches an inner surface of the cylindrical tube portion 51. The support 56A and the cylindrical tube portion 51 may be integrally produced, or they may be separately produced. The support 56A has the bar 55 fixed to its central portion. The structure of the support 56A shall not be limited to structures shown in FIGS. 13A and 13B, and the form of the central portion of the support 56A and the number of the arms may be determined as required.

In some cases, a shut-off valve may be used. In a conventional injection molding method, the nozzle portion 12B of the second injection cylinder 10B is provided with a shut-off valve operable with a hydraulic cylinder. In a conventional injection molding method, immediately after the completion of [Step-110], the hydraulic cylinder is operated to close the shut-off valve, so that back flow of the second molten resin 40B into the second injection cylinder 10B is prevented. In the injection molding method of the present invention, the shut-off valve is kept open even after the completion of [Step-110], and the hydraulic cylinder is operated to close the shut-off valve at a point of time when the second molten resin 40B having a volume equal to the volume of first molten resin 40A which flows into the second resin-flow-passage 23B flows back into the second injection cylinder 10B, so that further back flow of the second molten resin 40B into the second injection cylinder 10B is prevented, whereby the first molten resin in the first resin-flow-passage can be allowed to flow into the second resin-flow-passage. The timing of closing the shut-off valve provided in the second injection cylinder 10B after the initiation of injection of the first molten resin 40A in [Step-120] can be determined by carrying out various experiments.

Otherwise, the injection hydraulic cylinder 18B provided in the second injection cylinder 10B may be modified, and the back flow device may be constituted of the screw 11B provided in the second injection cylinder 18B. That is, when a pressure of the second molten resin 40B is exerted on the screw 11B from the cavity side, the screw 11B is not free to move backward but moves back in a predetermined quantity, and the injection hydraulic cylinder 18B is allowed to have the function to inhibit any further backward movement of the screw 11B. In the above constitution, in [Step-120], when the first molten resin 40A flows into the second resin-flow-passage 23B, the second molten resin 40B flows back into the injection cylinder 10B. However, at a point of time when the second molten resin 40B having a volume equal to the first molten resin 40A which flows into the second resin-flow-passage 23B flows back into the second injection cylinder 10B, any further backward movement of the screw 11B is inhibited. That is, any further back flow of the second molten resin 40B into the second injection cylinder 10B is inhibited, and as a result, the amount of the first molten resin 40A which flows into the second resin-flow-passage 23B is controlled to be constant. In this manner, a constant amount of the first molten resin in the first resin-flow-passage can be allowed to flow into the second-resin-flow-passage.

In Example 1, the injection molding apparatus having two injection cylinders and having two resin-flow-passages connecting the insides of the two injection cylinders to the cavity is explained as an example, while the number of injection cylinders may be three or more. In this case, resin-flow-passages of the same number as that of the injection cylinders can be provided. And, between [Step-110] and [Step-120], third, fourth, . . . molten resins prepared in the third, the fourth, . . . injection cylinders can be injected into the cavity 25. In this case, one resin-flow-passage corresponds to the first resin-flow-passage, and the remaining resin-flow-passages correspond to the second resin-flow-passage. The volume of the first molten resin which flows into each of the second resin-flow-passages is 5 to 50%, preferably 5 to 35%, more preferably 5 to 25%, based on the cavity volume. Further, the number of cavities provided in the mold shall not be limited to one, and any number of cavities can be provided. When a plurality of cavities are provided, it is sufficient to divide each of the first resin-flow-passage and the second resin-flow-passage into branches of the same number as that of the cavities and connect resin-flow-passage branches to gate portions opened to the cavities. In this case, it is preferred in the injection molding apparatus of the present invention to divide the resin-flow-passages downstream of the back flow device. The volume of the first molten resin which flows into each of the second resin-flow-passages is 5 to 50%, preferably 5 to 35%, more preferably 5 to 25%, based on the cavity volume.

Example 1 employs a structure in which the gate cut pin is provided in the second resin-flow-passage 23B, while the gate cut pin may be omitted when the structure of the gate portion and the temperature of molten resin in the gate portion are properly set.

In Example 1, further, resins are plasticized, melted and metered in the injection cylinders, and molten resins are injected from the injection cylinders, while there may be employed a pot type molding apparatus (also called a shooting pot type or heating pot type). In the pot type molding apparatus, a resin is plasticized, melted and metered in a cylinder, and a molten resin is filled in an injection pot. A check valve is provided between the cylinder and the injection pot. The molten resin filled in the injection pot is pressurized with the injection cylinder, and the second molten resin is injected into a cavity through a resin-flow-passage and a gate portion. In the above pot type molding apparatus, the back flow device can be provided in a second resin-flow passage connecting the injection pot and the cavity.

The present invention will be explained more in detail with reference to Examples 2 to 11 and Comparative Examples 1 to 3, hereinafter. The following Table 1 shows temperature conditions in these Examples and Comparative Examples, and the temperature conditions shown in Table 1 were employed unless otherwise specified. Further, these Examples and Comparative Examples used the injection molding apparatus of Example 1 shown in FIG. 1.

TABLE 1

| | |
|---|---|
| Temperature of first molten resin 40A in injection cylinder 10A: | 270° C. |
| Temperature of second molten resin 40B in injection cylinder 10B: | 260° C. |
| Temperatures in first and second resin-flow-passages in hot runner block: | 270° C. |
| Temperature of mold coolant in cavity block: | 15° C. |

A polyethylene terephthalate resin was measured for an intrinsic viscosity ($\eta$) in the presence of mixed solvents of phenol/tetrachloroethane=6/4 (weight ratio) at 30° C. A poly-m-xylyleneadipamide resin was measured for a relative viscosity ($\eta_{rel}$) under conditions of resin 1 gram/96% sulfuric acid 100 ml at 25° C. Further, a sample having dimensions of 10 mm (width)×100 mm (length) was measured for an interlayer adhesion strength at a peel direction of 180 degrees at a peel rate of 20 mm/minute.

EXAMPLE 2

A polyethylene terephthalate resin having an intrinsic viscosity of 0.75 (PET resin, RT543C, supplied by Nippon Unipet K.K.) was used as a first resin 40A, and a poly-m-xylyleneadipamide resin having a relative viscosity of 2.7 (N-MXD6 resin, #6007, supplied by Mitsubishi Gas Chemical Co., Inc.) was used as a second resin 40B. PET resin, N-MXD6 resin and PET resin were alternately injected according to the steps explained in Example 1, to mold a five-layer-structured parison according to an alternate-injection molding method (the method of injection molding a multi-layered article according to the first aspect of the present invention). The parison had a length of 110 mm, a wall thickness of 4.5 mm and an outer diameter of 26.5 mm. A multi-layered bottle obtained from the above parison by a biaxial stretch blow molding method has dimensions of 200 mm in total length, 75 mm in outer diameter and 600 ml in volume.

Part of each of the first resin-flow-passage 23A and the second resin-flow-passage 23B upstream to (on the injection cylinder side) the junction portion of the first and second resin-flow-passages 23A and 23B has a dual (double) tube structure, and these parts had a length of 120 mm. The first resin-flow-passage 23A on the outer side of the dual tube structure had an outer diameter of 18 mm and an inner diameter of 14 mm. The tubular second resin-flow-passage 23B on the inner side of the dual tube structure had a diameter of 8 mm. Further, the cylindrical gate cut pin 26 had an outer diameter of 4 mm.

An injection cylinder having an inner diameter of 50 mm was used as a first injection cylinder 10A, and the first resin 40A (PET resin) was plasticized and melted. An injection cylinder having an inner diameter of 40 mm was used as a second injection cylinder 10B, and the second resin 40B (N-MXD6 resin) was plasticized and melted. The ball-type back flow control valve 30B was used as the back flow device. The mold 20 was provided with four cavities 25, each of the resin-flow-passages 23A and 23B was divided into branches downstream of the back flow control valve 30B, and the branches were connected to the gate portions 24 opened to the cavities 25.

Before injection molding, first molten resin 40a which flowed into the second resin-flow-passage 23B in a previous molding cycle was left in the second resin-flow-passage 23B in an amount equal to 5% of the volume of each cavity 25.

First, in the same manner as in [Step-100], first molten resin 40A (molten PET resin) was injected into each cavity 25 in an amount equal to 30% of the volume of each cavity 25. In this step, no first molten resin 40A flowed into the second resin-flow-passage 23B.

Then, in the same manner as in [Step-110], second molten resin 40B (molten N-MXD6 resin) was injected into each cavity 25 from the second injection cylinder 10B in an amount equal to 5% of the volume of each cavity 25. The first molten resin 40a, which flowed into the second resin-flow-passage 23B in the previous molding cycle and was left in an amount equal to 5% of the volume of each cavity 25, was also injected into each cavity 25. In this step, neither second molten resin 40B nor first molten resin 40a flowed into the first resin-flow-passage 23A.

Then, in the same manner as in [Step-120], first molten resin 40A (molten PET resin) was injected into each cavity 25 from the first injection cylinder 10A in a total of an amount equal to 60% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 5% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the N-MXD6 resin layer/the PET resin layer/the N-MXD6 resin layer/the PET resin layer as shown in FIG. 5, and these resin layers were finely formed without any turbulence. Further, there was found no phenomenon that the N-MXD6 resin layer came to exist on the outermost layer (the inside surface and the outside surface) of the parison. When the obtained multi-layered parisons were heated at 100° C. and biaxially stretch blow molded into multi-layered bottles, each of the obtained multi-layered bottles had an excellent appearance.

EXAMPLE 3

Parisons were molded using the same injection molding apparatus as that described in Example 2, except that the back flow device was replaced with a ball-type back flow control valve 30B having a ball 34 which had the same diameter as that of the ball 34 in the back flow control valve 30B used in Example 2 but was provided with a larger movement distance of the ball 34 than the back flow control valve used in Example 2.

Before injection molding, first molten resin 40a which flowed into the second resin-flow-passage 23B in a previous molding cycle was left in the second resin-flow-passage 23B in an amount equal to 15% of the volume of each cavity 25.

First, in the same manner as in [Step-100], first molten resin 40A (molten PET resin) was injected into each cavity 25 in an amount equal to 40% of the volume of each cavity 25. In this step, no first molten resin 40A flowed into the second resin-flow-passage 23B.

Then, in the same manner as in [step-110], second molten resin 40B (molten N-MXD6 resin) was injected into each cavity 25 from the second injection cylinder 10B in an amount equal to 5% of the volume of each cavity 25. The first molten resin 40a, which flowed into the second resin-flow-passage 23B in the previous molding cycle and was left in an amount equal to 15% of the volume of each cavity 25, was also injected into each cavity 25. In this step, neither second molten resin 40B nor first molten resin 40a flowed into the first resin-flow-passage 23A.

Then, in the same manner as in [Step-120], first molten resin 40A (molten PET resin) was injected into each cavity 25 from the first injection cylinder 10A in a total of an amount equal to 40% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 15% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the N-MXD6 resin layer/the PET resin layer/the N-MXD6 resin layer/the PET resin layer as shown in FIG. 5, and these resin layers were finely formed without any turbulence. Further, there was found no phenomenon that the N-MXD6 resin layer came to exist on the outermost layer (the inside surface and the outside surface) of the parison. Further, there were obtained multi-layered bottles having an excellent appearance each.

EXAMPLE 4

An ethylene-vinyl acetate copolymer resin saponification product (EVOH, EVAL EF-E, supplied by Kuraray Co., Ltd.) was used in place of the N-MXD6 resin used as a second resin 40B in Example 2. The following Table 2 shows temperature conditions in Example 4. Injection molding was carried out by virtue of the same injection molding apparatus as that in Example 2, except that the back flow device was replaced with a ball-type back flow control valve 30 having a ball 34 which had the same diameter as that of the ball 34 in the back flow control valve 30B used in Example 3 but was provided with a larger movement distance of the ball 34 than the back flow control valve used in Example 3.

TABLE 2

| | |
|---|---|
| Temperature of first molten resin 40A in injection cylinder 10A: | 270° C. |
| Temperature of second molten resin 40B in injection cylinder 10B: | 230° C. |
| Temperatures in first and second resin-flow-passages in hot runner block: | 270° C. |
| Temperature of mold coolant in cavity block: | 15° C. |

Before injection molding, first molten resin 40a which flowed into the second resin-flow-passage 23B in a previous molding cycle was left in the second resin-flow-passage 23B in an amount equal to 25% of the volume of each cavity 25.

First, in the same manner as in [Step-100], first molten resin 40A (molten PET resin) was injected into each cavity 25 in an amount equal to 40% of the volume of each cavity 25. In this step, no first molten resin 40A flowed into the second resin-flow-passage 23B.

Then, in the same manner as in [Step-110], second molten resin 40B (molten EVOH resin) was injected into each cavity 25 from the second injection cylinder 10B in an amount equal to 5% of the volume of each cavity 25. The first molten resin 40a, which flowed into the second resin-flow-passage 23B in the previous molding cycle and was left in an amount equal to 25% of the volume of each cavity 25, was also injected into each cavity 25. In this step, neither second molten resin 40B nor first molten resin 40a flowed into the first resin-flow-passage 23A.

Then, in the same manner as in [Step-120], first molten resin 40A (molten PET resin) was injected into each cavity 25 from the first injection cylinder 10A in a total of an amount equal to 30% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40 A into the second resin-flow-passage 23B was limited to 25% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the EVOH resin layer/the PET resin layer/the EVOH resin layer/the PET resin layer as shown in FIG. 5, and these resin layers were finely formed without any turbulence. Further, there was found no phenomenon that the EVOH resin layer came to exist on the outermost layer (the inside surface and the outside surface) of the parison. Further, there were obtained multi-layered bottles having an excellent appearance each.

EXAMPLE 5

There was used the same injection molding apparatus as that described in Example 2, except that the back device was replaced with a ball-type back flow control valve 30B having a ball 34 which had the same diameter as that of the ball 34 in the back flow control valve 30B used in Example 2 but was provided with a larger movement distance of the ball 34 than the back flow control valve used in Example 2, and except that a conventional ball check valve was disposed in the nozzle portion 12A of the first injection cylinder 10A. A recycled PET resin was used as a second resin 40B in place of the N-MXD6 resin.

Before injection molding, first molten resin 40a which flowed into the second resin-flow-passage 23B in a previous molding cycle was left in the second resin-flow-passage 23B in an amount equal to 10% of the volume of each cavity 25.

First, in the same manner as in [Step-100], first molten resin 40A (molten PET resin) was injected into each cavity 25 in an amount equal to 50% of the volume of each cavity 25. In this step, no first molten resin 40A flowed into the second resin-flow-passage 23B.

Then, in the same manner as in [Step-110], second molten resin 40B (recycled PET resin) was injected into each cavity 25 from the second injection cylinder 10B in an amount equal to 20% of the volume of each cavity. The first molten resin 40a, which flowed into the second resin-flow-passage 23B in the previous molding cycle and was left in an amount equal to 10% of the volume of each cavity 25, was also injected into each cavity 25. In this step, neither second molten resin 40B nor first molten resin 40a flowed into the first resin-flow-passage 23A, since the ball check valve was disposed in the nozzle portion 12A of the first injection cylinder 10A.

Then, in the same manner as in [Step-120], first molten resin 40A (molten PET resin) was injected into each cavity 25 from the first injection cylinder 10A in a total of an amount equal to 20% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 10% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the recycled PET resin layer/the PET resin layer/the recycled PET resin layer/ the PET resin layer as shown in FIG. 5, and these resin layers were finely formed without any turbulence. Further, there was found no phenomenon that the recycled PET resin layer came to exist on the outermost layer of the parison. When the obtained multi-layered parisons were heated at 100° C. and biaxially stretch blow molded into multi-layered bottles, each of the obtained multi-layered bottles had an excellent appearance.

EXAMPLE 6

There was used the same injection molding apparatus as that described in Example 2, except that the back flow device was replaced with a ball-type back flow control valve 30B having a ball 34 which had the same diameter as that of the ball 34 in the back flow control valve 30B used in Example 4 but was provided with a larger movement distance of the ball 34 than the back flow control valve used in Example 4, and except that a conventional ball check valve was disposed in the nozzle portion 12A of the first injection cylinder 10A. Further, a recycled PET resin was used as a second resin 40B in place of the N-MXD6 resin.

Before injection molding, first molten resin 40a which flowed into the second resin-flow-passage 23B in a previous molding cycle was left in the second resin-flow-passage 23B in an amount equivalent to 50% of the volume of each cavity 25.

First, in the same manner as in [Step-100], first molten resin 40A (molten PET resin) was injected into each cavity 25 in an amount equivalent to 30% of the volume of each cavity 25. In this step, no first molten resin 40A flowed into the second resin-flow-passage 23B.

Then, in the same manner as in [Step-110], second molten resin 40B (recycled PET resin) was injected into each cavity 25 from the second injection cylinder 10B in an amount equal to 10% of the volume of each cavity 25. The first molten resin 40a, which flowed into the second resin-flow-passage 23B in the previous molding cycle and was left in an amount equal to 50% of the volume of each cavity 25, was also injected into each cavity 25. In this step, neither second molten resin 40B nor first molten resin 40a flowed into the first resin-flow-passage 23A, since the ball check valve was disposed in the nozzle portion 12A of the first injection cylinder 10A.

Then, in the same manner as in [Step-120], first molten resin 40A (molten PET resin) was injected into each cavity 25 from the first injection cylinder 10A in a total of an amount equal to 10% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 50% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the recycled PET resin layer/the PET resin layer/the recycled PET resin layer/ the PET resin layer, and the resin layers composing these layers had a turbulence to some extent, while the turbulence was not that which caused a problem in practical use. Further, there was found no phenomenon that the recycled PET resin layer came to exist on the outermost layer of the parison. When the obtained multi-layered parisons were heated at 100° C. and biaxially stretch blow molded into multi-layered bottles, each of the obtained multi-layered bottles had an excellent appearance.

EXAMPLE 7

The same resins as those in Example 2 and the same injection molding apparatus as that in Example 2 were used for injection molding. Temperature conditions were set as shown in Table 1. Example 7 differs from Example 2 in the following point. Example 2 employed an alternate-injection molding method, while Example 7 employed a simultaneous-injection molding method (the method of injection molding a multi-layered article according to the second aspect of the present invention).

Before injection molding, first molten resin 40a which flowed into the second resin-flow-passage 23B in a previous molding cycle was left in the second resin-flow-passage 23B in an amount equivalent to 5% of the volume of each cavity 25.

First, in the same manner as in [Step-100], first molten resin 40A (molten PET resin) was injected into each cavity 25 in an amount equivalent to 20% of the volume of each cavity 25. In this step, no first molten resin 40A flowed into the second resin-flow-passage 23B.

Then, while the injection of the first molten resin 40A (molten PET resin) into each cavity 25 was continued, second molten resin 40B (molten N-MXD6 resin) was injected into each cavity 25 from the second injection cylinder 10B in an amount equal to 5% of the volume of each cavity 25. The first molten resin 40a, which flowed into the second resin-flow-passage 23B in the previous molding cycle and was left in an amount equal to 5% of the volume of each cavity 25, was also injected into each cavity 25. In this step, neither second molten resin 40B nor first molten resin 40a flowed into the first resin-flow-passage 23A.

Then, the injection of the second molten resin 40B into each cavity 25 was terminated. And, the injection of the first molten resin 40A (molten PET resin) into each cavity 25 was continued, to completely fill each cavity 25 with the molten resin in a total of an amount equal to 70% of each cavity 25 and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 5% of the volume of each cavity 25 by the operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a three-layer structure of the PET resin layer/the N-MXD6 resin layer/the PET resin layer as shown in FIG. 11A, and these resin layers were finely formed without any turbulence. Further, there was found no phenomenon that the N-MXD6 resin layer came to exist on the outermost layer of the parison. When the obtained multi-layered parisons were heated at 100° C. and biaxially stretch blow molded into multi-layered bottles, each of the obtained multi-layered bottles had an excellent appearance.

EXAMPLE 8

Parisons were molded by virtue of the same injection molding apparatus as that in Example 2 under the same conditions as those in Example 2 except that the back flow device was replaced with a sliding valve-type back flow control valve 50 shown in FIG. 12A.

Before injection molding, first molten resin 40a which flowed into the second resin-flow-passage 23B in a previous molding cycle was left in the second resin-flow-passage 23B in an amount equal to 20% of the volume of each cavity 25.

First, in the same manner as in [Step-110], first molten resin 40A (molten PET resin) was injected into each cavity 25 in an amount equal to 30% of the volume of each cavity 25. In this step, no first molten resin 40A flowed into the second resin-flow-passage 23B.

Then, in the same manner as in [Step-110], second molten resin 40B (molten N-MXD6 resin) was injected into each cavity 25 from the second injection cylinder 10B in an amount equal to 5% of the volume of each cavity 25. The first molten resin 40a, which flowed into the second resin-flow-passage 23B in the previous molding cycle and was left in an amount equal to 20% of the volume of each cavity 25, was also injected into each cavity 25. In this step, neither second molten resin 40B nor first molten resin 40a flowed into the first resin-flow-passage 23A.

Then, in the same manner as in [Step-120], first molten resin 40A (molten PET resin) was injected into each cavity 25 from the first injection cylinder 10A in a total of an amount equal to 45% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 20% of the volume of each cavity 25 on the basis of operation of the back flow control valve 50.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the N-MXD6 resin layer/the PET resin layer/the N-MXD6 resin layer/the PET resin layer as shown in FIG. 5, and these resin layers were finely formed without any turbulence. Further, there was found no phenomenon that the N-MXD6 resin layer came to exist on the outermost layer (the inside surface and the outside surface) of the parison. Further, there were obtained multi-layered bottles having an excellent appearance each.

EXAMPLE 9

A PET resin having an intrinsic viscosity of 0.75 and a polyethylene-2,6-naphthalate resin (PEN resin) having an intrinsic viscosity of 0.50 were blended in a weight ratio of 90/10, and the resultant blend was used as a first resin 40A. The same injection molding apparatus as that used in Example 2 was used. The temperature conditions were set as shown in the following Table 3.

TABLE 3

| | |
|---|---|
| Temperature of first molten resin 40A in injection cylinder 10A: | 290° C. |
| Temperature of second molten resin 40B in injection cylinder 10B: | 260° C. |
| Temperatures in first and second resin-flow-passages in hot runner block: | 290° C. |
| Temperature of mold coolant in cavity block: | 15° C. |

Before injection molding, first molten resin 40a which flowed into the second resin-flow-passage 23B in a previous molding cycle was left in the second resin-flow-passage 23B in an amount equal to 5% of the volume of each cavity 25.

First, in the same manner as in [Step-100], first molten resin 40A (molten PET resin/PEN resin) was injected into each cavity 25 in an amount equal to 30% of the volume of each cavity 25. In this step, no first molten resin 40A flowed into the second resin-flow-passage 23B.

Then, in the same manner as in [Step-110], second molten resin 40B (molten N-MXD6 resin) was injected into each cavity 25 from the second injection cylinder 10B in an amount equal to 5% of the volume of each cavity 25. The first molten resin 40a, which flowed into the second resin-flow-passage 23B in the previous molding cycle and was left in an amount equal to 5% of the volume of each cavity 25, was also injected into each cavity 25. In this step, neither second molten resin 40B nor first molten resin 40a flowed into the first resin-flow-passage 23A.

Then, in the same manner as in [Step-120], first molten resin 40A (molten PET resin/PEN resin) was injected into each cavity 25 from the first injection cylinder 10A in a total of an amount equal to 60% of each cavity 25 to fill each cavity 25 with the molten resins and an amount in which first molten resin 40A was to flow into the second resin-flow-passage 23B. In this step, the first molten resin 40A flowed into the second resin-flow-passage 23B, the second molten resin 40B in the second resin-flow-passage 23B flowed back, and the screw 11B in the second injection cylinder 10B moved back. However, the flowing of the first molten resin 40A into the second resin-flow-passage 23B was limited to 5% of the volume of each cavity 25 on the basis of operation of the back flow control valve 30B.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET-PEN resin layer/the N-MXD6 resin layer/the PET-PEN resin layer/the N-MXD6 resin layer/the PET-PEN resin layer, and these resin layers were finely formed without any turbulence. Further, there was found no phenomenon that the N-MXD6 resin layer came to exist on the outermost layer (the inner surface and the outer surface) of the parison. When the obtained multilayered parisons were heated at 110° C. and biaxially stretch blow molded into multi-layered bottles, each of the obtained multi-layered bottles had an excellent appearance.

EXAMPLE 10

The same resins as those in Example 2 and the same injection molding apparatus as that in Example 2 were used for injection molding, except that a conventional ball check valve was disposed in the nozzle portion 12A of the first injection cylinder 10A. Temperature conditions were set as shown in Table 1. Example 10 differs from Example 2 in the following point. Example 2 employed an alternate-injection molding method according to the first aspect of the present invention, while Example 10 employed the method of injection molding a multi-layered article according to the third aspect of the present invention (alternate-injection molding method).

Before injection molding, first molten resin 40a which flowed into the second resin-flow-passage 23B in a previous molding cycle was left in the second resin-flow-passage 23B in an amount equivalent to 10% of the volume of each cavity 25.

First, in the same manner as in [Step-100], first molten resin 40A (molten PET resin) was injected into each cavity 25 in an amount equal to 70% of the volume of each cavity 25. In this step, no first molten resin 40A flowed into the second resin-flow-passage 23B.

Then, the injection of the first molten resin 40A (molten PET resin) into each cavity 25 was terminated, and in the same manner as in [Step-110], second molten resin 40B (molten N-MXD6 resin) prepared in the second injection cylinder 10B was injected into each cavity 25 through the second resin-flow-passage 23B in an amount equal to 20% of the volume of each cavity 25. The first molten resin 40a, which flowed into the second resin-flow-passage 23B in the previous molding cycle and was left in an amount equal to 10% of the volume of each cavity 25, was also injected into each cavity 25.

After the injection of the second molten resin 40B into each cavity 25 was completed, a dwell pressure was applied with the first injection cylinder 10A for 15 seconds, and the first molten resin 40A in the first resin-flow-passage 23A was allowed to flow into the second resin-flow-passage 23B on the basis of operation of the ball-type back flow control valve 30B. That is, the first molten resin 40A flowed into the second resin-flow-passage 23B, the second molten resin 40B flowed back in the second resin-flow-passage 23B, and the screw 11B in the second injection cylinder 10B moved back. However, the flowing of the first molten resin 40A into the second resin-flow-passage 23B was limited to 10% of the volume of each cavity 25 on the basis of operation of the back flow control valves 30B.

Then, the gate cut pin 26 was moved forward by actuating the air cylinder 27, to close the gate portion 24, followed by cooling for 10 seconds. The mold was opened and parisons as multi-layered articles were taken out of the mold. There was found no phenomenon that the N-MXD6 resin layer came to exist on the parison surface other than the portion of the parison corresponding to the gate portion. When the obtained multi-layered parisons were heated at 100° C. and biaxially stretch blow molded into multi-layered bottles, each of the obtained multi-layered bottles had an excellent appearance.

EXAMPLE 11

The same resins as those in Example 2 and the same injection molding apparatus as that in Example 2 were used for injection molding, except that a conventional ball check valve was disposed in the nozzle portion 12A of the first injection cylinder 10A. Temperature conditions were set as shown in Table 1. Example 11 differs from Example 2 in the following point. Example 2 employed an alternate-injection molding method according to the first aspect of the present invention, while Example 11 employed the method of injection molding a multi-layered article according to the fourth aspect of the present invention (simultaneous-injection molding method).

Before injection molding, first molten resin 40a which flowed into the second resin-flow-passage 23B in a previous molding cycle was left in the second resin-flow-passage 23B in an amount equivalent to 20% of the volume of each cavity 25.

First, in the same manner as in [Step-100], first molten resin 40A (molten PET resin) was injected into each cavity 25 in an amount equivalent to 40% of the volume of each cavity 25. In this step, no first molten resin 40A flowed into the second resin-flow-passage 23B.

Then, while the injection of the first molten resin 40A (molten PET resin) into each cavity 25 in an amount equivalent to 20% of the volume of each cavity 25 was continued, second molten resin 40B (molten N-MXD6 resin) was injected into each cavity 25 from the second injection cylinder 10B in an amount equivalent to 20% of the volume of each cavity 25. The first molten resin 40a, which flowed into the second resin-flow-passage 23B in the previous molding cycle and was left in an amount equal to 20% of the volume of each cavity 25, was also injected into each cavity 25.

The injection of the first molten resin 40A and the injection of the second molten resin 40B were nearly concurrently completed. Then, a dwell pressure was applied with the first injection cylinder 10A for 15 seconds, and the first molten resin 40A in the first resin-flow-passage 23A was allowed to flow into the second resin-flow-passage 23B on the basis of operation of the ball-type back flow control valve 30B. That is, the first molten resin 40A flowed into the second resin-flow-passage 23B, the second molten resin 40B flowed back in the second resin-flow-passage 23B, and the screw 11B in the second injection cylinder 10B moved back. However, the flowing of the first molten resin 40A into the second resin-flow-passage 23B was limited to 20% of the volume of each cavity 25 on the basis of operation of the back flow control valves 30B.

Then, the gate cut pin 26 was moved forward by actuating the air cylinder 27, to close the gate portion 24, followed by cooling for 10 seconds. The mold was opened and parisons as multi-layered articles were taken out of the mold. There was found no phenomenon that the N-MXD6 resin layer came to exist on the parison surface other than the portion of the parison corresponding to the gate portion. When the obtained multi-layered parisons were heated at 100° C. and biaxially stretch blow molded into multi-layered bottles, each of the obtained multi-layered bottles had an excellent appearance.

COMPARATIVE EXAMPLE 1

Parisons were molded in the same manner as in Example 2 using the same first and second resins and the same injection molding apparatus as those described in Example 2, except that the back flow device was replaced with a ball-type back flow control device 30B having a ball 34 which had the same diameter as that of the ball 34 in the back flow control valve 30B used in Example 6 but was provided with a larger movement distance of the ball 34 than the back flow control valve used in Example 6.

The flowing of first molten resin 40A into the second resin-flow-passage 23B reaches as much as 60% or more of the volume of each cavity 25, and varied greatly from one injection molding cycle to another. The metered amount of the second molten resin 40B in the second injection cylinder 10B was increased, while no stabilized molding was possible. Obtained five-layered parisons showed an intense turbulence in their layer structures.

COMPARATIVE EXAMPLE 2

Parisons were molded in the same manner as in Example 2 using the same first and second resins and the same injection molding apparatus as those described in Example 2, except that the back flow device was replaced with a conventional ball check valve for preventing back flow of a molten resin.

First, in the same manner as in [Step-100], first molten resin 40A (molten PET resin) was injected into each cavity 25 in an amount equivalent to 60% of the volume of each cavity 25. In this step, no first molten resin 40A flowed into the second resin-flow-passage 23B.

Then, in the same manner as in [Step-110], second molten resin 40B (molten N-MXD6 resin) was injected into each cavity 25 from the second injection cylinder 10B in an amount equal to 10% of the volume of each cavity 25.

Then, in the same manner as in [Step-120], first molten resin 40A (molten PET resin) was injected into each cavity 25 from the first injection cylinder 10A in an amount equal to 30% of the volume of each cavity 25 to fill each cavity 25 with the molten resins. In this step, the first molten resin 40A did not flow into the second resin-flow-passage 23B since the conventional check valve was used.

Then, a dwell pressure was applied with the first injection cylinder 10A for 15 seconds, and then the gate cut pin 26 was moved forward by actuating the air cylinder 27, to close the gate portion 24, followed by cooling for 10 seconds. The mold was opened and parisons as multi-layered articles were taken out of the mold. Each of the obtained parisons had a five-layer structure of the PET resin layer/the N-MXD6 resin layer/the PET resin layer/the N-MXD6 resin layer/the PET resin layer. Further, there was found the N-MXD6 resin existing on the outermost layer of each parison.

COMPARATIVE EXAMPLE 3

Parisons were molded in the same manner as in Example 2 using the same first and second resins and the same injection molding apparatus as those described in Example 2, except that the back flow device was replaced with a conventional shut-off valve which was open/close operated with a hydraulic cylinder. That is, the shutoff valve open/close operable with a hydraulic cylinder was provided in the nozzle portion 12B of the second injection cylinder 10B. Immediately after the completion of [Step-110], the shut-off valve was closed by operating the hydraulic cylinder, to prevent the back flow of the second molten resin 40B into the second injection cylinder 10B. The flow amount of first molten resin 40A into the second resin-flow-passage 23B was 0 to 0.9% of the volume of each cavity 25.

As a result, when first molten resin 40A (molten PET resin) was injected in a step similar to [Step-100], second molten resin 40B (molten N-MXD6 resin) in the second resin-flow-passage 23B was taken to flow into each cavity 25 with the first molten resin 40A, and the second resin 40B (N-MXD6 resin) existed on the surface of the outermost layer formed of the first resin 40A (PET resin) near an opening portion of each of the obtained five-layered parisons.

The present invention has been explained with reference to preferred embodiments herinabove, while the present invention shall not be limited thereto. The injection molding apparatus explained in Example 1 is shown as an example and may be modified in design as required. Further, the injection molding apparatus and injection molding conditions explained in Examples are shown as examples and may be modified in design or changed as required. The resins used in Examples are also shown as examples. In [Step-110], a simultaneous-injection molding method may be practiced in which the molten resin 40B is injected while continuing the injection of the molten resin 40A and the injection of the molten resin 40A is kept on after completion of injection of the molten resin 40B. In Examples, the second molten resin flows back through the back flow device while there can be a case where not only second molten resin but also first molten resin flows back through the back flow device depending upon a position where the back flow device is disposed.

The back flow device of the present invention can also be applied to intermittent switching between two fluids (including a fluid body consisting of liquid with a relatively high viscosity). The back flow device of the present invention can be still also applied to intermittent switching between two gases. The back flow device is quite beneficial when applied to intermittent switching in such fields or gases where the liquid or gas for the first supply should be prevented from being mixed with the liquid or gas for the second supply, typically as fields of petrochemistry, food production (confectionery production, food processing, etc.) chemical products manufacturing equipment, waste water treatment facility so forth. Suitable cases are exemplified as:

(1) a case for preventing crude oil from being mixed with sea water in a crude oil/sea water switching equipment at a crude oil mining facility, (2) a case for preventing one certain-colored cream from being mixed with another cream with another color when two colored and high-viscosity creams are alternately used in confectionery production, (3) a case for preventing sea water from being mixed with fresh water in food processing, typically in marine products processing, (4) a case for preventing a crude product from being mixed with a final product when a single piping is used both for storage facilities of the crude and final products in a chemical products manufacturing equipment, (5) a case for switching an absorption line and a desorption line in an ion exchanger, and (6) a case for preventing source gas or crude gas from being mixed with high-purity gas when a high-purity gas production facility is operated under intermittent switching of gas flows.

In the injection molding apparatus of the present invention or the injection molding method of the present invention, when the first molten resin is being injected, there can be prevented a phenomenon that the first molten resin for forming an outer layer of a multi-layered article and the second molten resin for forming an inner (intermediate) layer, present in the second resin-flow-passage, are mixed with each other or that the second molten resin which is not in an injected state is taken into the first molten resin which is being injected. As a result, there can be reliably avoided a problem that, for example, the second resin comes to exist on the surface of a multi-layered article. If a parison is molded from resins such as a thermoplastic polyester resin and a gas-barrier resin as a multi-layered article, a multi-layered container excellent in gas-barrier properties, transparency and mechanical strength can be produced by biaxial stretch blow molding of the parison. Moreover, the occurrence of a turbulence in the resin layers constituting the layers of a multi-layered article can be reliably prevented by defining the upper limit of the amount of the first molten resin which flows into the second resin-flow-passage.

Further, the back flow device which is constituted of a back flow control valve can avoid an increase in the size of an injection molding apparatus and a complication of the injection molding apparatus, and prevents the leakage of the molten resin from resin-flow-passages. Furthermore, the back flow device is readily operable, and the flowing of a constant amount of the first molten resin into the second resin-flow-passage can be secured.

What is claimed is:

1. A method of injection molding a multi-layered article by utilizing an apparatus including
   (i) a mold including a hot runner block and a cavity block having a cavity;
   (ii) at least a first injection cylinder and a second injection cylinder;
   (iii) a first resin-flow-passage located within said hot runner block and connecting said first injection cylinder and said cavity;
   (iv) a second resin-flow-passage located within said hot runner block and connecting said second injection cylinder and said cavity, wherein said first resin-flow passage and said second resin-flow-passage communicate with each other at a junction portion upstream of said cavity; and
   (v) a back flow device operable to allow a first molten resin in said first resin-flow-passage to flow into said second resin-flow-passage after a second molten resin has been injected into said cavity through said second resin-flow-passage, wherein said back flow device is operable in response to pressure exerted by the first molten resin located in said first resin-flow-passage against the second molten resin located in said second resin-flow-passage, said method comprising:
   injecting a first molten resin from the first injection cylinder through the first resin-flow-passage into the cavity, and then discontinuing the injection of the first molten resin into the cavity;
   injecting a second molten resin from the second injection cylinder through the second resin-flow-passage into the cavity, and then discontinuing the injection of the second molten resin into the cavity; and then
   injecting the first molten resin from the first injection cylinder through the first resin-flow-passage into the cavity, and allowing the first molten resin in the first resin-flow-passage to flow into the second resin-flow-passage in response to operation of the back flow device either during injection of the first molten resin into the cavity or after completion of the first molten resin into the cavity.

2. The method according to claim 1, wherein the cavity includes a main cavity portion and a gate portion, with said gate portion interconnecting said first and second resin-flow-passages with said main cavity portion such that
   injecting a first molten resin from the first injection cylinder through the first resin-flow-passage into the cavity includes injecting the first molten resin from the first injection cylinder through the first resin-flow-passage, through the gate portion, and then into the main cavity portion, and
   injecting a second molten resin from the second injection cylinder through the second resin-flow-passage into the cavity includes injecting the second molten resin from the second injection cylinder through the second resin-flow-passage, through the gate portion, and then into the main cavity portion.

3. The method according to claim 2, wherein allowing the first molten resin in the first resin-flow-passage to flow into the second resin-flow-passage in response to operation of the back flow device includes allowing a constant amount of the first molten resin in the first resin-flow-passage to flow into the second resin-flow-passage in response to operation of the back flow device.

4. The method according to claim 2, further comprising:
   using the back flow device to bring the second injection cylinder and the main cavity portion into fluid communication with each other prior to the injection of the second molten resin through the second resin-flow-passage, through the gate portion, and into the main cavity portion;
   using the back flow device to maintain the second injection cylinder and the main cavity portion in fluid communication with each other after the second molten resin has been injected into the main cavity portion; and
   using the back flow device to remove the second injection cylinder and the main cavity portion from fluid communication with each other after a predetermined amount of the first molten resin located within the first resin-flow-passage has flowed into the second resin-flow-passage.

5. The method according to claim 2, further comprising:
   using the back flow device to bring the second injection cylinder and the main cavity portion into fluid communication with each other prior to the injection of the second molten resin through the second resin-flow-passage, through the gate portion, and into the main cavity portion;
   using the back flow device to maintain the second injection cylinder and the main cavity portion in fluid communication with each other after the second molten resin has been injected into the main cavity portion; and
   using the back flow device to remove the second injection cylinder and the main cavity portion from fluid communication with each other after the first molten resin located within the first resin-flow-passage begins to flow into the second resin-flow-passage.

6. The method according to claim 2, wherein the injection of the first and second molten resins into the main cavity portion results in an article including a main portion having respective alternating layers of the first and second resins, with there being three layers of the first resin and two layers of the second resin.

7. The method according to claim 2, wherein the injection of the first and second molten resins into the main cavity portion results in an article including a main portion and a secondary portion each having respective alternating layers of the first and second resins, with there being three layers of the first resin and two layers of the second resin constituting the main portion, and two layers of the first resin and one layer of the second resin constituting the secondary portion.

8. The method according to claim 2, wherein the back flow device is positioned within the second resin-flow-passage between the junction portion and the second injection cylinder.

9. The method according to claim 8, wherein the second injection cylinder includes a nozzle portion such that injecting a second molten resin from the second injection cylinder through the second resin-flow-passage into the cavity includes injecting the second molten resin from the second injection cylinder, through the nozzle portion, through the second resin-flow-passage, through the gate portion, and then into the main cavity portion, and wherein the back flow device is positioned within the second resin-flow-passage at one of (i) between the mold and the nozzle portion and, (ii) within the nozzle portion.

10. The method according to claim 2, wherein the back flow device comprises a back flow control valve, and allowing the first molten resin in the first resin-flow-passage to flow into the second resin-flow-passage in response to operation of the back flow device includes allowing the first molten resin in the first resin-flow-passage to flow into the second resin-flow-passage in response to operation of the back flow control valve.

11. The method according to claim 10, wherein the back flow control valve is one of a ball back flow control valve and a sliding back flow control valve.

12. The method according to claim 2, wherein allowing the first molten resin in the first resin-flow-passage to flow into the second resin-flow-passage in response to operation of the back flow device includes allowing from 5% to 50% volume, of the main cavity portion, of the first molten resin in the first resin-flow-passage to flow into the second resin-flow-passage in response to operation of the back flow device.

13. The method according to claim 12, wherein allowing the first molten resin in the first resin-flow-passage to flow into the second resin-flow-passage in response to operation of the back flow device includes allowing from 5% to 25% volume, of the main cavity portion, of the first molten resin in the first resin-flow-passage to flow into the second resin-flow-passage in response to operation of the back flow device.

14. The method according to claim 2, wherein the injection of the first and second molten resins into the main cavity portion results in a parison as the multi-layered article.

15. The method according to claim 2, wherein the injection of the first and second molten resins into the main cavity portion results in a parison as the multi-layered article, with an outermost layer of the parison being formed from the first molten resin material that is injected into the main cavity portion through the first resin-flow-passage.

16. The method according to claim 2, wherein the first molten resin comprises at least one resin selected from the group consisting of a thermoplastic polyester resin, a thermoplastic copolyester resin, a polyolefin resin, an aliphatic polyamide resin, a polycarbonate resin, a polyacrylonitrile resin, a polyvinyl chloride resin and a polystyrene resin.

17. The method according to claim 2, wherein the second molten resin comprises at least one resin selected from the group consisting of a gas-barrier resin, a recycled polyethylene terephthalate resin and a colored polyethylene terephthalate resin.

18. The method according to claim 17, wherein the gas-barrier resin comprises at least one resin selected from the group consisting of a m-xylylene-group-containing polyamide resin, a saponification product of an ethylene-vinyl acetate copolymer resin, a polyacrylonitrile resin and a polyvinylidene chloride resin.

19. A method of injection molding a multi-layered article by utilizing an apparatus including
(i) a mold including a hot runner block and a cavity block having a cavity;
(ii) at least a first injection cylinder and a second injection cylinder;
(iii) a first resin-flow-passage located within said hot runner block and connecting said first injection cylinder and said cavity;
(iv) a second resin-flow-passage located within said hot runner block and connecting said second injection cylinder and said cavity, wherein said first resin-flow passage and said second resin-flow-passage communicate with each other at a junction portion upstream of said cavity; and
(v) a back flow device operable to allow a first molten resin in said first resin-flow-passage to flow into said second resin-flow-passage after a second molten resin has been injected into said cavity through said second resin-flow-passage, wherein said back flow device is operable in response to pressure exerted by the first molten resin located in said first resin-flow-passage against the second molten resin located in said second resin-flow-passage, said method comprising:
injecting a first molten resin from the first injection cylinder through the first resin-flow-passage into the cavity;
injecting a second molten resin from the second injection cylinder through the second resin-flow-passage into the cavity simultaneously with the injection of the first molten resin into the cavity; and
after completion of the injection of the second molten resin into the cavity, allowing the first molten resin in the first resin-flow-passage to flow into the second resin-flow-passage in response to operation of the back flow device either during injection of the first molten resin into the cavity or after completion of the first molten resin into the cavity.

20. The method according to claim 19, wherein the cavity includes a main cavity portion and a gate portion, with said gate portion interconnecting said first and second resin-flow-passages with said main cavity portion such that
injecting a first molten resin from the first injection cylinder through the first resin-flow-passage into the cavity includes injecting the first molten resin from the first injection cylinder through the first resin-flow-passage, through the gate portion, and then into the main cavity portion, and
injecting a second molten resin from the second injection cylinder through the second resin-flow-passage into the cavity includes injecting the second molten resin from the second injection cylinder through the second resin-flow-passage, through the gate portion, and then into the main cavity portion.

21. The method according to claim 20, wherein allowing the first molten resin in the first resin-flow-passage to flow into the second resin-flow-passage in response to operation of the back flow device includes allowing a constant amount of the first molten resin in the first resin-flow-passage to flow into the second resin-flow-passage in response to operation of the back flow device.

22. The method according to claim 20, further comprising:
using the back flow device to bring the second injection cylinder and the main cavity portion into fluid communication with each other prior to the injection of the second molten resin through the second resin-flow-passage, through the gate portion, and into the main cavity portion;
using the back flow device to maintain the second injection cylinder and the main cavity portion in fluid communication with each other after the second molten resin has been injected into the main cavity portion; and using the back flow device to remove the second injection cylinder and the main cavity portion from fluid communication with each other after a predetermined amount of the first molten resin located within the first resin-flow-passage has flowed into the second resin-flow-passage.

23. The method according to claim 20, further comprising:

using the back flow device to bring the second injection cylinder and the main cavity portion into fluid communication with each other prior to the injection of the second molten resin through the second resin-flow-passage, through the gate portion, and into the main cavity portion;

using the back flow device to maintain the second injection cylinder and the main cavity portion in fluid communication with each other after the second molten resin has been injected into the main cavity portion; and using the back flow device to remove the second injection cylinder and the main cavity portion from fluid communication with each other after the first molten resin located within the first resin-flow-passage begins to flow into the second resin-flow-passage.

24. The method according to claim 20, wherein the injection of the first and second molten resins into the main cavity portion results in an article including a main portion having respective alternating layers of the first and second resins, with there being two layers of the first resin and one layer of the second resin.

25. The method according to claim 20, wherein the injection of the first and second molten resins into the main cavity portion results in an article including a main portion part of which has respective alternating layers of the first and second resins, with there being two layers of the first resin and one layer of the second resin.

26. The method according to claim 20, wherein the back flow device is positioned within the second resin-flow-passage between the junction portion and the second injection cylinder.

27. The method according to claim 26, wherein the second injection cylinder includes a nozzle portion such that injecting a second molten resin from the second injection cylinder through the second resin-flow-passage into the cavity includes injecting the second molten resin from the second injection cylinder, through the nozzle portion, through the second resin-flow-passage, through the gate portion, and then into the main cavity portion, and wherein the back flow device is positioned within the second resin-flow-passage at one of: (i) between the mold and the nozzle portion and, (ii) within the nozzle portion.

28. The method according to claim 20, wherein the back flow device comprises a back flow control valve, and allowing the first molten resin in the first resin-flow-passage to flow into the second resin-flow-passage in response to operation of the back flow device includes allowing the first molten resin in the first resin-flow-passage to flow into the second resin-flow-passage in response to operation of the back flow control valve.

29. The method according to claim 28, wherein the back flow control valve is one of a ball back flow control valve and a sliding back flow control valve.

30. The method according to claim 20, wherein allowing the first molten resin in the first resin-flow-passage to flow into the second resin-flow-passage in response to operation of the back flow device includes allowing from 5% to 50% volume, of the main cavity portion, of the first molten resin in the first resin-flow-passage to flow into the second resin-flow-passage in response to operation of the back flow device.

31. The method according to claim 30, wherein allowing the first molten resin in the first resin-flow-passage to flow into the second resin-flow-passage in response to operation of the back flow device includes allowing from 5% to 25% volume, of the main cavity portion, of the first molten resin in the first resin-flow-passage to flow into the second resin-flow-passage in response to operation of the back flow device.

32. The method according to claim 20, wherein the injection of the first and second molten resins into the main cavity portion results in a parison as the multi-layered article.

33. The method according to claim 20, wherein the injection of the first and second molten resins into the main cavity portion results in a parison as the multi-layered article, with an outermost layer of the parison being formed from the first molten resin material that is injected into the main cavity portion through the first resin-flow-passage.

34. The method according to claim 20, wherein the first molten resin comprises at least one resin selected from the group consisting of a thermoplastic polyester resin, a thermoplastic copolyester resin, a polyolefin resin, an aliphatic polyamide resin, a polycarbonate resin, a polyacrylonitrile resin, a polyvinyl chloride resin and a polystyrene resin.

35. The method according to claim 20, wherein the second molten resin comprises at least one resin selected from the group consisting of a gas-barrier resin, a recycled polyethylene terephthalate resin and a colored polyethylene terephthalate resin.

36. The method according to claim 35, wherein the gas-barrier resin comprises at least one resin selected from the group consisting of a m-xylylene-group-containing polyamide resin, a saponification product of an ethylene-vinyl acetate copolymer resin, a polyacrylonitrile resin and a polyvinylidene chloride resin.

37. A method of injection molding a multi-layered article by utilizing an apparatus including (i) a mold including a hot runner block and a cavity block having a cavity;

(ii) at least a first injection cylinder and a second injection cylinder;

(iii) a first resin-flow-passage located within said hot runner block and connecting said first injection cylinder and said cavity;

(iv) a second resin-flow-passage located within said hot runner block and connecting said second injection cylinder and said cavity, wherein said first resin-flow passage and said second resin-flow-passage communicate with each other at a junction portion upstream of said cavity; and (v) a back flow device operable to allow a first molten resin in said first resin-flow-passage to flow into said second resin-flow-passage after a second molten resin has been injected into said cavity through said second resin-flow-passage, wherein said back flow device is operable in response to pressure exerted by the first molten resin located in said first resin-flow-passage against the second molten resin located in said second resin-flow-passage, said method comprising:

injecting a first molten resin from the first injection cylinder through the first resin-flow-passage into the cavity, and then discontinuing the injection of the first molten resin into the cavity;

injecting a second molten resin from the second injection cylinder through the second resin-flow-passage into the cavity, and then discontinuing the injection of the second molten resin into the cavity; and applying a dwell pressure with the first injection cylinder, and allowing the first molten resin in the first resin-flow-passage to flow into the second resin-flow-passage in response to operation of the back flow device.

38. The method according to claim 37, wherein the cavity includes a main cavity portion and a gate portion, with said gate portion interconnecting said first and second resin-flow-passages with said main cavity portion such that injecting a first molten resin from the first injection cylinder through the first resin-flow-passage into the cavity includes injecting the first molten resin from the first injection cylinder through the first resin-flow-passage, through the gate portion, and then into the main cavity portion, and injecting a second molten resin from the second injection cylinder through the second resin-flow-passage into the cavity includes injecting the second molten resin from the second injection cylinder through the second resin-flow-passage, through the gate portion, and then into the main cavity portion.

39. A method of injection molding a multi-layered article by utilizing an apparatus including (i) a mold including a hot runner block and a cavity block having a cavity;

(ii) at least a first injection cylinder and a second injection cylinder;

(iii) a first resin-flow-passage located within said hot runner block and connecting said first injection cylinder and said cavity;

(iv) a second resin-flow-passage located within said hot runner block and connecting said second injection cylinder and said cavity, wherein said first resin-flow passage and said second resin-flow-passage communicate with each other at a junction portion upstream of said cavity; and (v) a back flow device operable to allow a first molten resin in said first resin-flow-passage to flow into said second resin-flow-passage after a second molten resin has been injected into said cavity through said second resin-flow-passage, wherein said back flow device is operable in response to pressure exerted by the first molten resin located in said first resin-flow-passage against the second molten resin located in said second resin-flow-passage, said method comprising:

injecting a first molten resin from the first injection cylinder through the first resin-flow-passage into the cavity;

injecting a second molten resin from the second injection cylinder through the second resin-flow-passage into the cavity simultaneously with the injection of the first molten resin into the cavity; and substantially simultaneously discontinuing the injection of the first molten resin and the second molten resin into the cavity, then applying a dwell pressure with the first injection cylinder, and allowing the first molten resin in the first resin-flow-passage to flow into the second resin-flow-passage in response to operation of the back flow device.

40. The method according to claim 39, wherein the cavity includes a main cavity portion and a gate portion, with said gate portion interconnecting said first and second resin-flow-passages with said main cavity portion such that injecting a first molten resin from the first injection cylinder through the first resin-flow-passage into the cavity includes injecting the first molten resin from the first injection cylinder through the first resin-flow-passage, through the gate portion, and then into the main cavity portion, and injecting a second molten resin from the second injection cylinder through the second resin-flow-passage into the cavity includes injecting the second molten resin from the second injection cylinder through the second resin-flow-passage, through the gate portion, and then into the main cavity portion.

* * * * *